March 6, 1962 R. A. STAFFORD 3,023,962
SERIAL-PARALLEL ARITHMETIC UNITS WITHOUT CASCADED CARRIES
Filed May 23, 1957 7 Sheets-Sheet 1
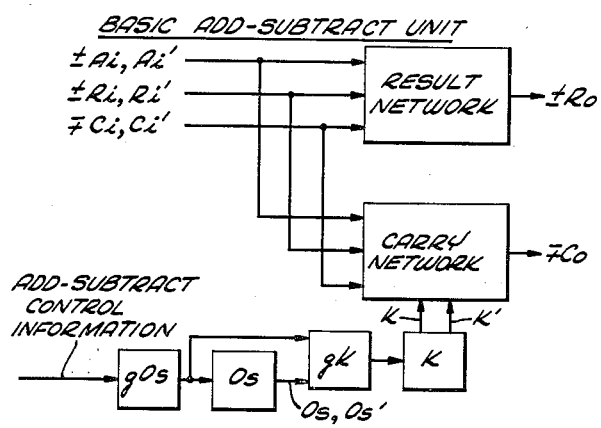
FIG. 1.
FIG. 1a.
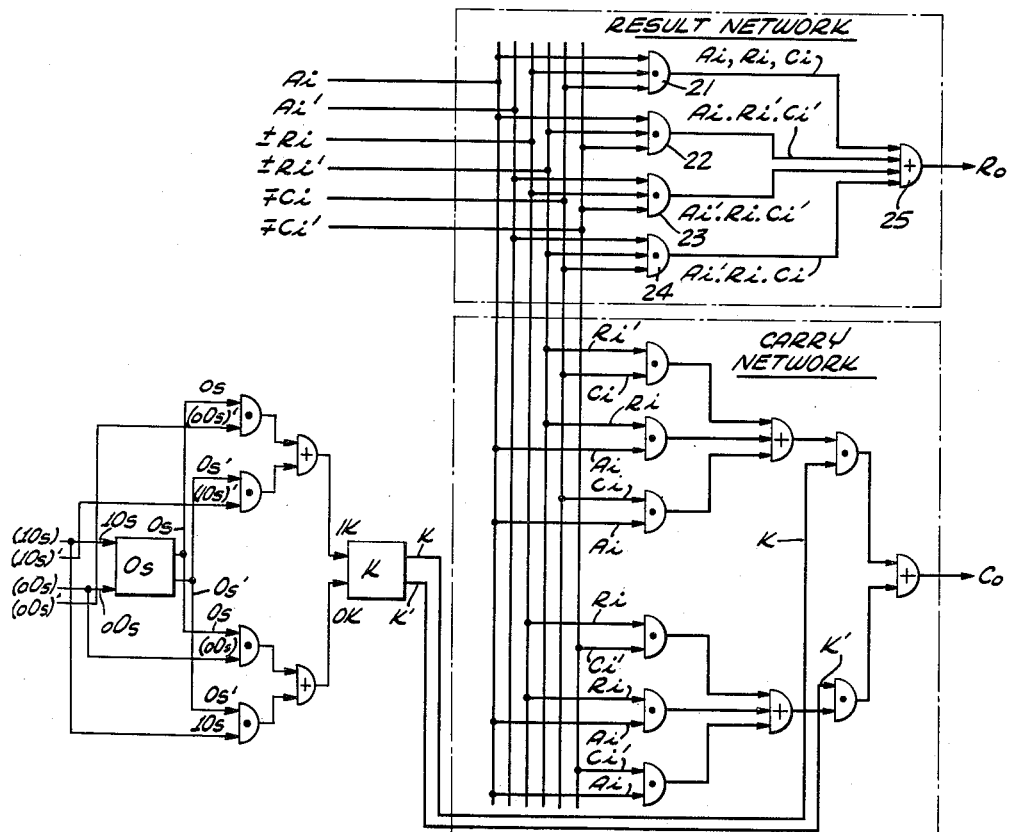
FIG. 2.
INVENTOR.
ROGER A. STAFFORD
BY ELWOOD S. KENDRICK
ATTORNEYS

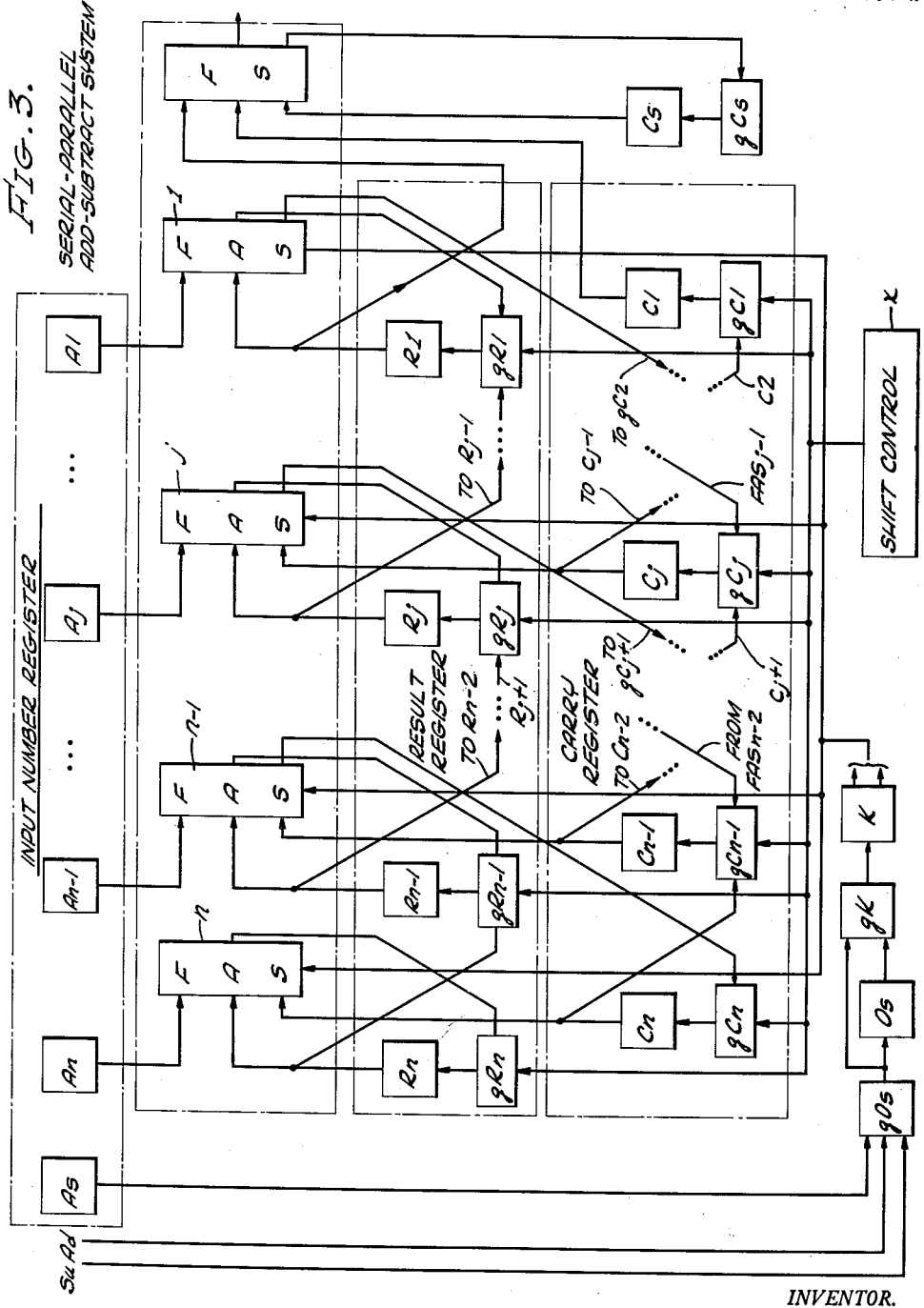

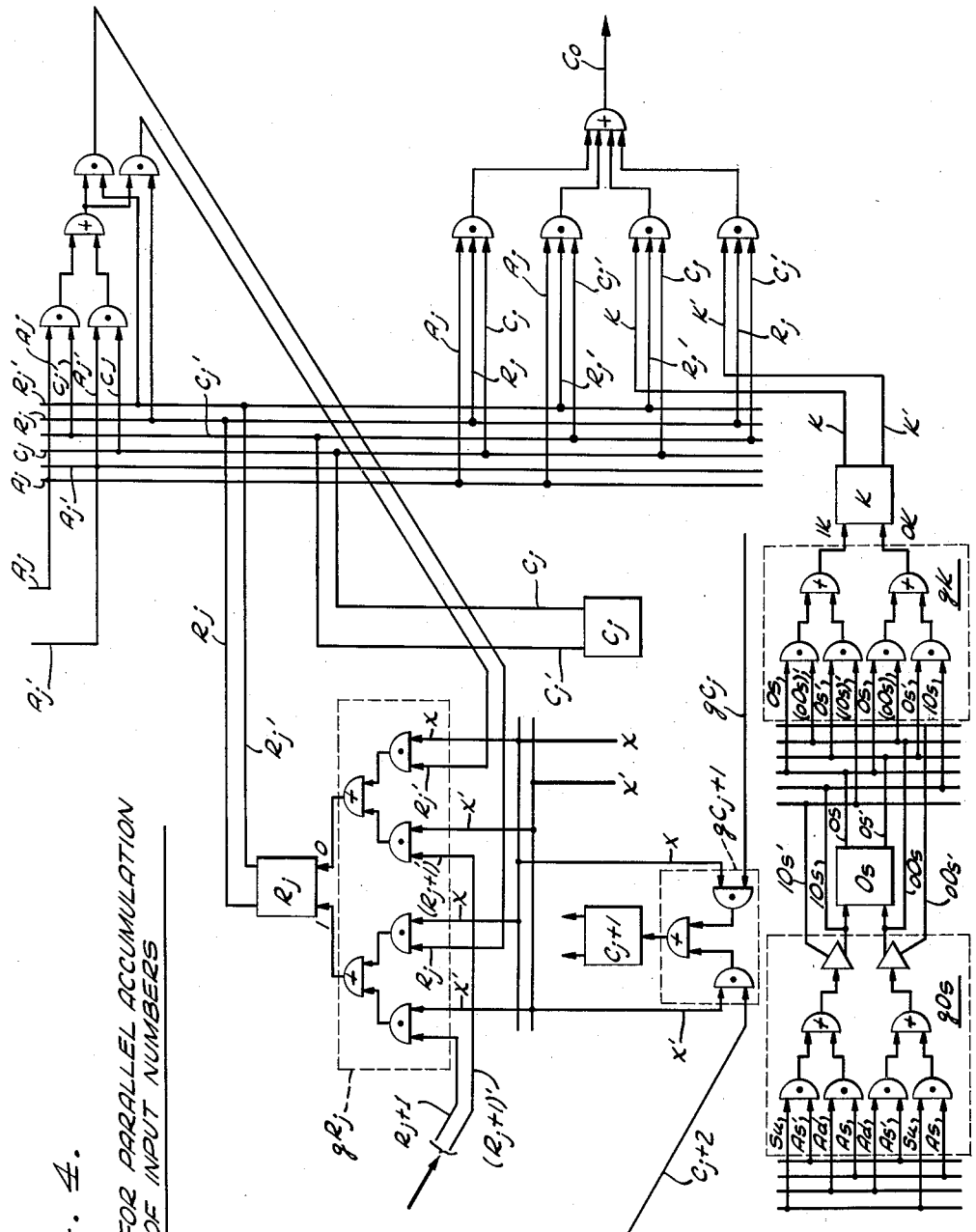

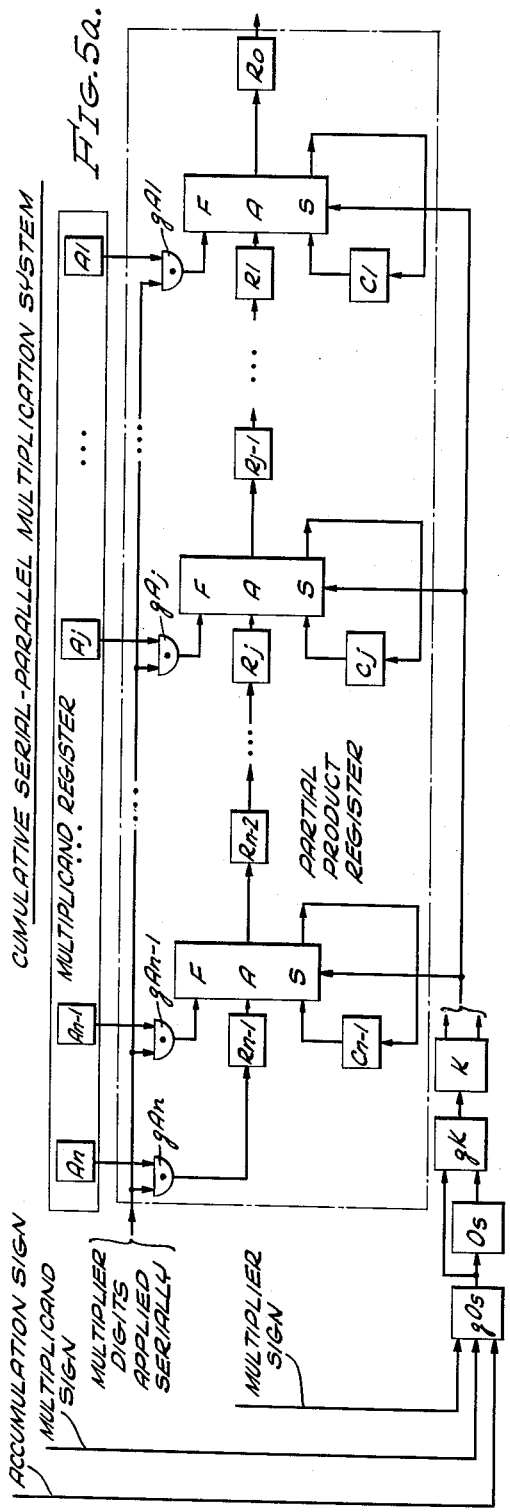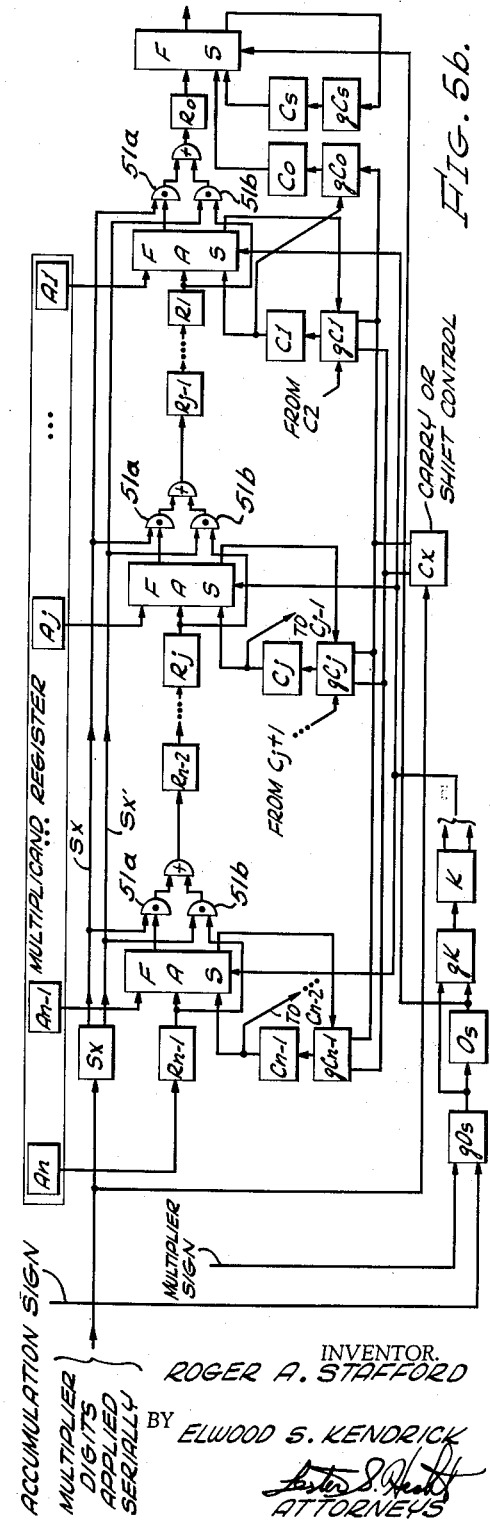

March 6, 1962  R. A. STAFFORD  3,023,962
SERIAL-PARALLEL ARITHMETIC UNITS WITHOUT CASCADED CARRIES
Filed May 23, 1957  7 Sheets-Sheet 5

INVENTOR.
ROGER A. STAFFORD
BY ELWOOD S. KENDRICK
ATTORNEYS

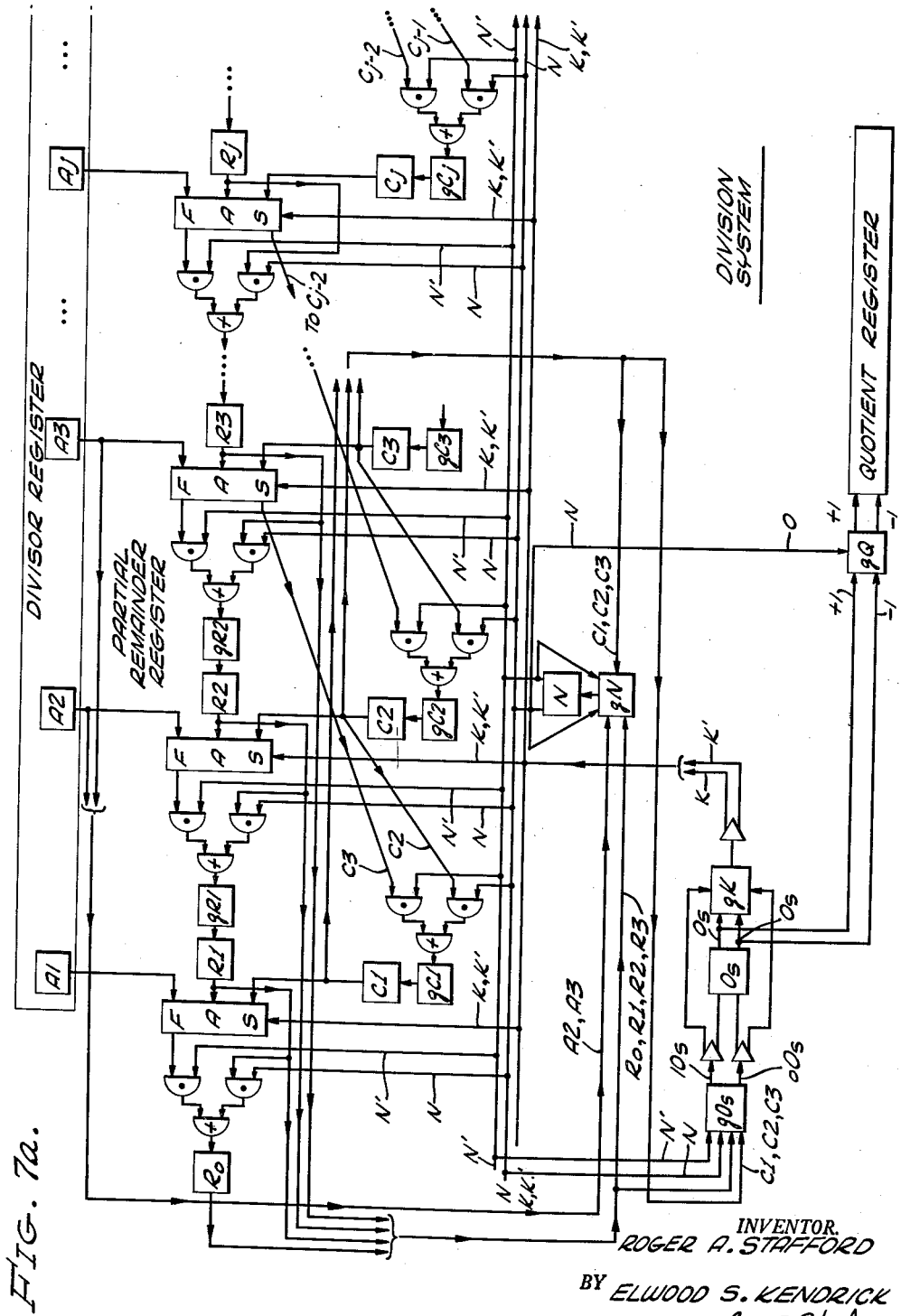

March 6, 1962
R. A. STAFFORD
3,023,962
SERIAL-PARALLEL ARITHMETIC UNITS WITHOUT CASCADED CARRIES
Filed May 23, 1957
7 Sheets-Sheet 7
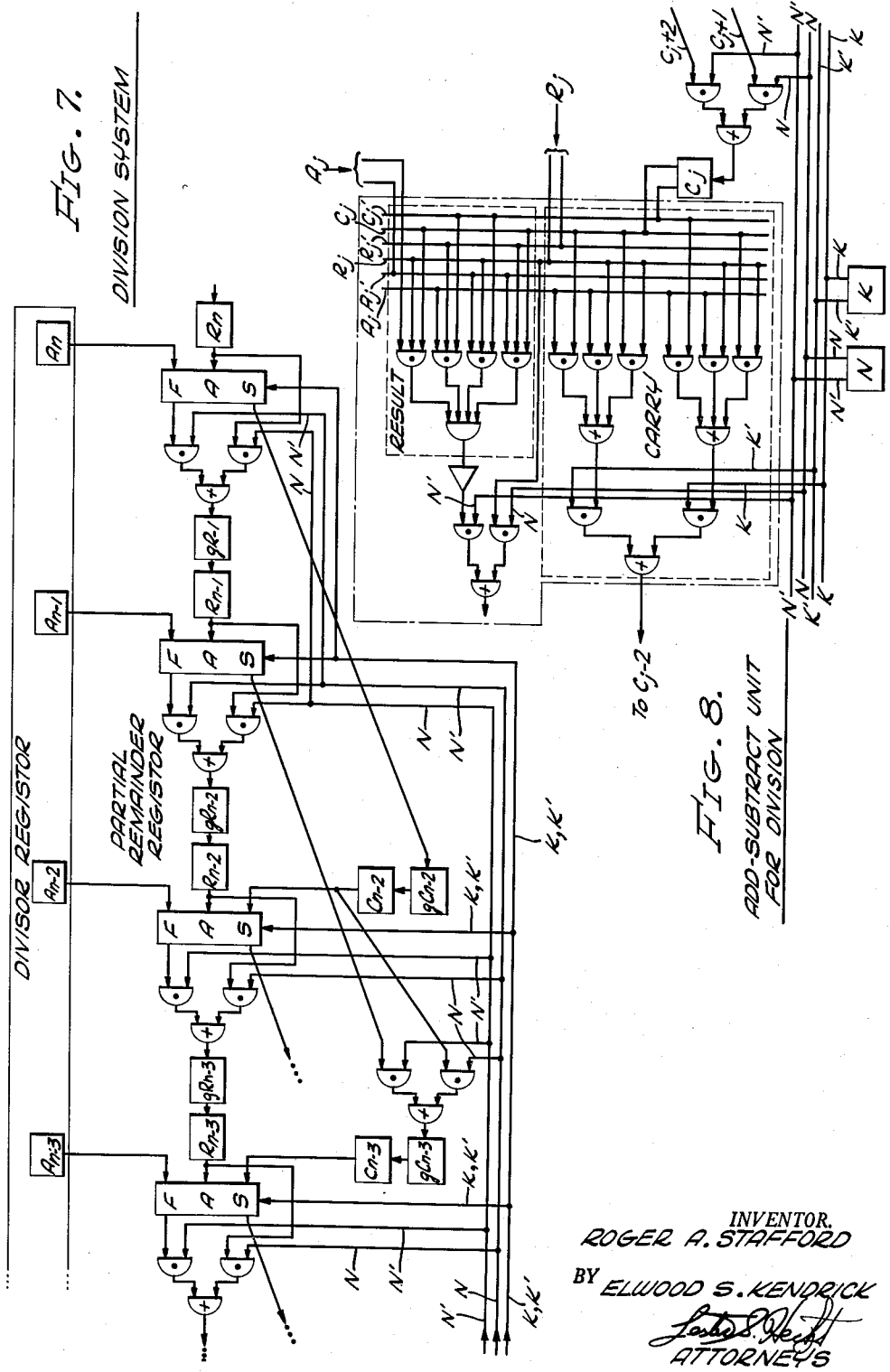
FIG. 7. DIVISION SYSTEM
FIG. 8. ADD-SUBTRACT UNIT FOR DIVISION
INVENTOR.
ROGER A. STAFFORD
BY ELWOOD S. KENDRICK
ATTORNEYS 3,023,962
SERIAL-PARALLEL ARITHMETIC UNITS
WITHOUT CASCADED CARRIES
Roger A. Stafford, Champaign, Ill., assignor, by mesne assignments, to Thompson Ramo Wooldridge Inc., Cleveland, Ohio, a corporation of Ohio
Filed May 23, 1957, Ser. No. 661,158
14 Claims. (Cl. 235—175)

This invention relates to serial-parallel arithmetic units, and more particularly to an arithmetic unit requiring relatively few component parts for high-speed operation.

While the present invention may have general application in various types of computer systems, it is particularly useful as employed in various accumulation processes, such as addition and subtraction series, cumulative multiplication, or division performed as a series of additions, subtractions or "do nothing" operations. The method and circuit techniques of the invention described below make it possible to accumulate separate partial result and carry digits in successive digit time intervals without allowing any time for propagating carries in order to form a complete result.

The maintenance of partial result and partial carry registers to maintain a number simply as two factors is relatively easy when it is not necessary to change the sign of the operation. That is, addition or multiplication constantly using a plus sign or constantly using a minus sign presents no problem. However, when these signs are changed intermittently during a series of computations, it is necessary to perform one of two functions in order to insure a correct partial carry and result due to the fact that with prior art it was possible to obtain different signs for different digits in the partial carry register. This means that the signs of separate digits had to be accounted for separately, or that each time an operation was performed, the carry had to be propagated or cascaded. That is, a complete answer would, of necessity, have to be obtained each time an operation was performed. In this case, time would thus have to be allowed for propagating the carries and the operation would be slow. In other words, prior art devices require an excessive amount of equipment to carry the signs of the individual digits or, alternatively, they require that time be given to cascading carries to obtain a complete result for each operation, thereby lengthening the time required to perform a series of operations.

The improvement of the invention in obviating the necessity of cascading carry signals may best be understood by considering a typical prior art approach. Reference for this purpose is made to pages 297 through 301 and FIGS. 13–24 of "High-Speed Computing Devices" by Engineering Research Associates, published in 1950 by McGraw-Hill Book Co.

Referring to page 297, in particular, it will be noted that a "parallel adder with simultaneous carry" is described where ". . . all carries are accomplished simultaneously . . .". In reading further on the same page, it will be observed that "actually, $n$ rise times are required to make $n$ carries, and in the Raytheon circuit about five pulse times have to be allowed on this account." Thus, while the circuit described in the above-mentioned book, representing a typical parallel adder circuit of the prior art, is quite complex, yet it cannot function as a true parallel adder in terms of a computer digit time interval, since five pulse periods must be allowed in order to allow the cascading of the carry signals from one end of the accumulator register to the other.

Thus in accumulating a series of numbers in the typical parallel system just described, the time required is a function of the length of the number of digits in a number as well as the number of numbers to be accumulated. This may be expressed as $Knm$ where $K$ is a constant, $n$ is the digits per number and $m$ is the number of numbers. It will be shown, however, that according to the present invention the same accumulation process is performed only as a function of the number of numbers to be accumulated, or, as a function of $m$.

Thus Raytheon circuit mentioned above requires five pulse times for $n$ carries in a register of about 20 digits ($Kn=5$). If $n$ were double this value (i.e., 40), however, the factor $Kn$ would be at least doubled so that each carry cascading would require 10 pulse periods.

The limitation of the prior art cascading type of control adder is even more pronounced when the operations of multiplication or division are considered. Specifically, in either of these cases, $m$ becomes equal to $n$. Thus the time required to multiply or to divide becomes proportional to $n^2$ because these operations are performed as many times as there are digits in a number to be operated upon.

The present invention, on the other hand, is adapted to perform multiplication or division during an $n$ pulse period, for an increase of speed in the order of $n$ to 1.

At this point note should be taken of the fact that the accumulated process of the present invention for addition and subtraction is not complete in terms of a conventional answer, since the technique of the present invention requires that a serial combination of the result and carry digits be performed in order to generate a complete result.

However, the time saved during the accumulation process, in accordance with the technique of the invention, results in an overall saving in time for a complete operation whenever the number of accumulations times the usual 5 pulse time delay for carries exceeds the sum of the number of accumulations and the additional $n$-digit time interval to formulate a complete result, in accordance with the present invention.

Moreover, in serial-parallel systems, an $n$-digit time interval is required to read operands in and to read operands out so that the interval required to combine result and carry digits may occur during the normal read-in or read-out period of computation and, accordingly, in such systems only the accumulation time need be considered.

The importance of the present invention will become even further evident when it is established below that the technique allows the accumulation of input numbers having any sign or form, and further that multiplication and simultaneous accumulation with a previous result is permissible. Consequently, a complex series of mixed multiplications, additions and subtractions may be performed without any interruption in removing any partial result from the accumulator register until the end of the entire series of operations, at which time the complete result may be read out by combining the result and carry signals previously formulated. Thus, in terms of an accumulation of signed numbers, the technique of the invention is adapted to solve a series:

$$(\pm N1) \pm (\pm N2) \pm \ldots (\pm Nn)$$

the total time required for accumulation being $n$ digit times, as discussed above.

It will be observed in the above series that each number may be either positive or negative and that it may be either added or subtracted. Hereafter, the sign of each number will be assumed to be included in the operation sign so that the operation $+(+N)$ or $-(-N)$ is considered to be a plus $(+)$ operation, whereas the operation $+(-N)$ or $-(+N)$ is considered to be a minus $(-)$ operation.

In a similar manner, the present invention may be employed to accumulate a series of products, each accumulation operation being performed simultaneously with the multiplication operation. Thus, the series:

$$\pm(\pm A1)\times(\pm B1)\pm(\pm A2)\times(\pm B2)$$
$$\pm \ldots (\pm An)\times(\pm Bn)$$

may be solved in $2.n.m$ digit times, where $m$ is the number of multiplier digits and $n$ represents the number of terms in the series. Here again the operation sign which will be referred to hereinafter is considered to be the combination of all the signs for the corresponding terms. Thus: $+(+A1)\times(+B1)$; $+(-A1)\times(-B1)$;

$$-(-A1)\times(+B1)$$

and $-(+A1)\times(-B1)$ are all considered to have a plus $(+)$ operation sign whereas: $-(+A1)\times(+B1)$; $-(-A1)\times(-B1)$; $+(-A1)\times(+B1)$; and $$+(+A1)\times(-B1)$$

all have a minus operation sign.

To the present time, in both cascading carries and carrying or storing the sign of each carry digit, it has been assumed that at all times the partial result of any system of this type must always be positive. This mental block has perhaps been a barrier to advances in this art because of its historical basis. However, once the arbitrary selection of a positive sign for the partial carry was made in the prior art, it became impossible to perform successive accumulations without cascading carries unless all numbers were of the same sign. According to the prior art technique, it is impossible to perform subtraction after a positive partial result and carry digits have been accumulated, unless the sign is carried along side each corresponding digit, since carries of both signs may remain in the accumulator register after computation.

According to the basic concept of the present invention, however, no arbitrary selection is made in either the sign of the partial result or partial carry signals. Instead it is revealed according to the present invention that the manner of determining the sign of the carry and result signals must be established as an algebraic rule determined by the operation sign.

According to the invention, it has been established that the partial carry signals which are accumulated will always have the same sign if their sign is made to be the same as the operation sign of the previous operation. That is, if addition is performed the carry signals are all made positive, and if subtraction is performed the carry signals are all made negative.

The next step of the invention was to recognize that the partial result in carry digits accumulated must be generated to have values such that the combination thereof, considering the digit values thereof to have opposite signs would result in a complete answer in each digital place having the desired value and sign.

According to this basic concept then, the partial result signals impliedly have negative signs during operations of addition, that is, where the operation sign is positive. Thus, by discarding the rigid rule of the prior art whereby the partial result digits are always positive and by generating these digits to be of opposite implied sign to the previous operation sign and partial carry signal sign, it has become possible, according to the invention, to accumulate numbers without cascaded carries by either addition or subtraction, without the necessity of indicating the sign for each individual digit, since this sign is known to be uniform throughout each of the carry and result registers.

Once it was established, according to the present invention, that the signs of all pairs of corresponding partial result and carry signals should be opposite, it was then determined that sign possibilities where the partial result and carry signals are of the same sign need not be considered since they cannot occur.

It can be shown that the present operation sign logically determines the inherent sign of the new carry signal. One manner of observing this is to note that where the input number digit and the previous result and carry digits are considered to have a weight of one, the new carry digit must have a weight of two. Consequently, if the previous result and carry digits have opposite signs, a carry having a weight of two can only occur with the aid of the input number, bearing the operation sign. Thus, where the previous result digit is a plus and the previous carry digit is a minus, a minus operation sign may result in a negative carry-over of two, or a positive operation sign may result in a positive carry-over of two. The fact, however, that the carry must bear the sign of the operation does not mean that the digit in a particular place must have the same sign. For example, the result digit may be positive, the carry digit negative, and the operation sign negative, but the total results in the particular binary place is positive if a one occurs in the result place and zeros in the carry and input digit places.

In accordance with the invention, the result digits are produced in a logical network which operates independently of the particular sign combinations of the input signals; and the carry digits are produced in accordance with two basic sets of logic, the first set being utilized when the signs of the previous carry and the present operation are the same, and the second set being utilized when the signs of the previous carry and the present operation are different. The two carry sets may also be considered to exist for the cases where the present and previous operation signs are the same and where the present and previous operation signs are different, respectively.

The basic method of the invention comprises the following steps:

(1) Producing a first control signal, which may be referred to as signal K hereafter, whenever the previous carry sign and present operation sign are the same, or stated in other words, whenever the previous and present operation signs are the same;

(2) Generating a first type of carry signal in response to the first control signal;

(3) Producing a second control signal, which may be referred to as signal K' hereafter, whenever the previous carry sign and the present operation sign are different, or stated in other words, whenever the previous and present operation signs are different;

(4) Producing a second type of carry signal in response to the second control signal; and (5) Generating all carry signals with a sign implied therein corresponding to the present operation sign, and generating result signals of opposite sign to respective carry signals; the carry and result signals produced constituting together a complete binary result considering the binary value of each digit and the implied sign thereof.

In its basic structural form, the invention contemplates a unit for combining input and previous result and carry signals in a binary digital place, to form carry-over and new result signals. The basic unit is duplicated for system usage so that a plurality thereof are provided, one for each digital place of an input number to be accumulated. Each unit includes a result network and a carry network including first and second carry circuits operative in response to first and second levels of a control signal. The control signal is generated as a function of the present and previous operation signs and may either be stored in a flip-flop or other bistable element or obtained through a logical amplifier. In general terms, the control signal is defined to have an "on" or binary one state whenever the present and next condition of the operation signal are going to be the same. Thus, if the operation signal is now on and is not going to be turned off, the control signal is on; and if the operation signal is now off, and is not going to be turned on, the control signal is on.

Accordingly, it is an object of the present invention to provide a method for accumulating binary result and carry signals in respective binary digital places whereby the signs of the signals are known as a function of the previous operation sign.

Another object of the invention is to provide a method for accumulating result and carry signals whereby successive input numbers having varying signs may be accumulated by addition or subtraction without the necessity of cascading carries.

A further object of the invention is to provide a method for the high-speed accumulation of input numbers obviating the consuming requirement of cascaded carries.

Still another object is to provide a simple arithmetic unit which may be employed in a serial-parallel computing system wherein binary result and carry digits may be accumulated as function of input signals in a respective binary place, without any information being required in the digital place as to carry signals which may result from carries from other digital places.

Yet a further object is to provide an arithmetic unit for generating result and carry signals of opposite implied signs, the carry signal being assumed to carry the sign of the operation, the arrangement thereby permitting the accumulating of input numbers of varying signs through either addition or subtraction.

Still a further object is to provide an arithmetic unit which may be employed in a serial-parallel multiplier system wherein successive products may be simultaneously combined with previous results regardless of the sign or form thereof.

An additional object is to provide an arithmetic unit which may be employed in a serial-parallel division wherein successive partial remainders may be formed by addition, subtraction, or "do nothing" without the necessity of carrying parallel sign information as to the result and carry signals in each place.

Yet another object is to provide a high-speed parallel accumulator network which may be operated to accumulate each input number during one digit time interval, no additional time being required for cascading carries.

A specific object is to provide a high-speed serial-parallel multiplier system wherein an $n$-digit multiplier may be multiplied times a multiplicand in $2 \cdot n$ digit time intervals, a complete result being obtained in series starting with the least significant digit thereof, the system permitting simultaneous accumulation to a previous result by either addition or subtraction.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

FIG. 1 is a block diagram of an arithmetic unit embodying the present invention;

FIG. 1a is a chart illustrating the sign considerations involved in practicing the method of the invention;

FIG. 2 illustrates in general schematic form the logic which may be employed in one embodiment of the invention;

FIG. 3 is a partial block diagram of a parallel accumulator system embodying arithmetic units of the invention;

FIG. 4 illustrates a specific form of unit which may be employed in the system of FIG. 3;

FIGS. 5a and 5b illustrate alternate forms of a serial-parallel multiplier system embodying the invention;

FIGS. 7a and 7b are schematic diagrams illustrating a division system incorporating simplified logic different from that shown in FIG. 2; and FIG. 8 illustrates a suitable form of arithmetic unit for the division system of FIG. 7.

Figure 6A:
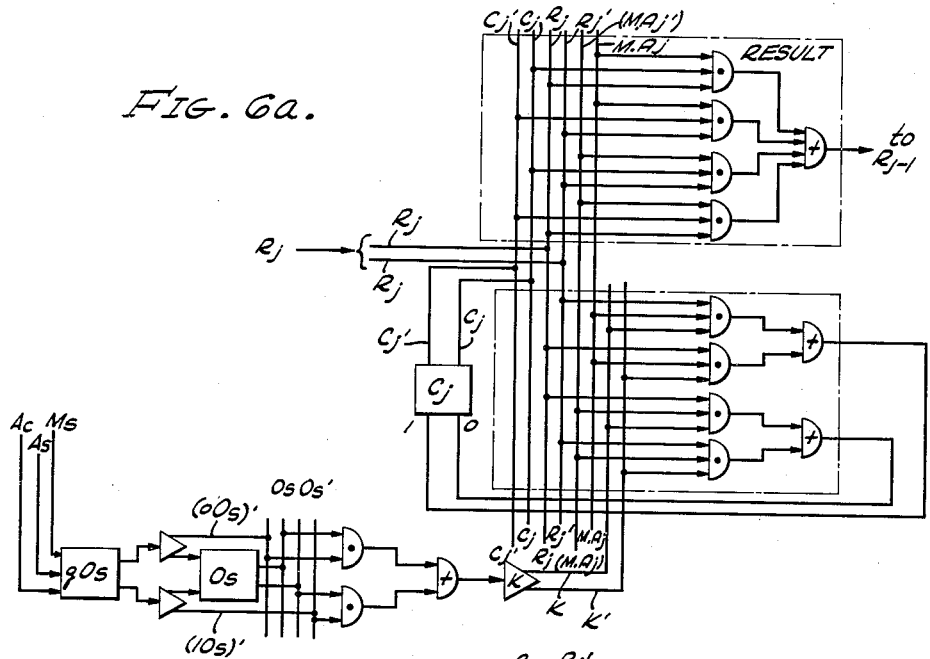
FIGS. 6a and 6b illustrate alternate forms of arithmetic units which may be employed in the embodiments of FIGS. 5a and 5b, respectively.

Referring now to FIG. 1, it will be noted that input signals $Ai$, $Ri$ and $Ci$ are applied to a result network and to a carry network producing output signals $Ro$ and $Co$, respectively. The carry network is controlled by device K producing complementary control signals K and K' and produces either of two types of carries depending upon the state of these control signals. Control device K receives input signals as a function of the previous operation sign, stored in a device $Os$, and of the present operation sign. Signals corresponding to the present operation sign are generated in a network $gOs$ which receives certain input information depending upon the particular operation which is performed.

In the discussion which follows, several logical definitions will be developed for the various networks shown in FIG. 1. Before considering the manner in which the applicable logic may be derived, it is helpful to analyze a few simple examples illustrating the manner in which various accumulation operations are performed in accordance with the basic approach of the present invention. As a first example, the binary number $+011$ ($+3$) and the binary number $-101$ ($-5$) will be combined to form accumulated result and carry signals. First it must be assumed that if the number $-101$ is a previous result, the previous carries, although zeros, must have been positive in accordance with the basic approach of the present invention. It will be noted, however, that it is also possible to assume that the number $-101$ is a series of previous carries, in which case it must be assumed that the result digits were positive and all zeros.

Four illustrative examples are shown below. The first example shows the situation where the number $-101$ is assumed to constitute a previous negative result and consequently the initial carries must be assumed to be positive even though they are all zero. The second example shows the situation where the number $-101$ is assumed to constitute initial carries and consequently the initial result is assumed to be positive. The third example illustrates the case where there are both initial result and carry digits, the operation sign being assumed to be positive; and the fourth example illustrates a similar situation where the operation sign is assumed to be negative.

EXAMPLE 1

|    |   | 4 | 3 | 2 | 1 |
|----|---|---|---|---|---|
| Ai | + |   | 0 | 1 | 1 |
| Ri | − |   | 1 | 0 | 1 |
| Ci | + |   | 0 | 0 | 0 |
| Ro | − |   | 1 | 1 | 0 |
| Co | + | 0 | 1 | 0 |   |

EXAMPLE 2

|    |   | 4 | 3 | 2 | 1 |
|----|---|---|---|---|---|
| Ai | + |   | 0 | 1 | 1 |
| Ri | + |   | 0 | 0 | 0 |
| Ci | − |   | 1 | 0 | 1 |
| Ro | − |   | 1 | 1 | 0 |
| Co | + | 0 | 1 | 0 |   |

EXAMPLE 3

|    |   | 4 | 3 | 2 | 1 |
|----|---|---|---|---|---|
| Ai | + |   | 0 | 0 | 0 |
| Ri | − |   | 1 | 0 | 1 |
| Ci | + |   | 0 | 1 | 1 |
| Ro | − |   | 1 | 1 | 0 |
| Co | + | 0 | 1 | 0 |   |

EXAMPLE 4

|    |   | 4 | 3 | 2 | 1 |
|----|---|---|---|---|---|
| Ai | − |   | 0 | 0 | 0 |
| Ri | + |   | 0 | 1 | 1 |
| Ci | − |   | 1 | 0 | 1 |
| Ro | + |   | 1 | 1 | 0 |
| Co | − | 1 | 0 | 0 |   |

It will be noted in the first three cases that the negative result signals shown as $Ro$, signifying the output digits of the result, represent the binary number $-110$ or $-6$ and that the carry digits $Co$ represent the binary number $+100$ or $+4$. Thus, the complete result is $-6 +4$ or $-2$. In the fourth case, however, the result is $+6$, rather than $-6$, and the carry signals provide $-8$, so that the answer in this case is $-8 +6$ or $-2$ again.

It will be noted that a digit is provided for the result $Ro$ in the same place as the corresponding input digits $Ri$, $Ci$ and $Ai$ and that the carry digit for the same accumulation is shifted to the left to constitute a weight of two. Thus, reviewing column 1 of the first example, it is noted that $+Ai$, $-Ri$, $+Ci$, have the values 1, 1 and 0, respectively, and that the result of this combination provides a zero output signal, since the ones in $-Ri$ and $+Ai$ cancel. Consequently, Ro is 0 and Co, in the next place, is 0.

Considering column 2 of Example 1 it will be noted that a 1 appears in input digit $+Ai$ and 0's are in the digits $Ri$ and $Ci$. Consequently, the answer for the particular place is $+1$. According to the basic technique of the invention, then, a carry must be developed which has the sign of the operation—which is the sign of $Ai(+)$ in this case. Furthermore, it must be noted that the carry weight is twice that of the result weight since it is carried over to the next place. This means that Co in the next place is 1, with a weight of 2, and Ro in column 2, is also a 1. The total result considered on the basis of the weight in the second column is effectively a $+2$ for signal Co and a $-1$ for signal Ro. The difference between these two signals is the desired answer of $+1$. In a similar manner an answer of $-1$ is required in the third place (third column) as the combination of the digits $Ri=-1$, $Ci=+0$, and $Ai=+0$. This is accomplished by inserting a $-1$ in the third column place for output number Ro and a 0 in the fourth column place for carry-over signal Co. The total weight referenced to column 3 is then: $2.0-1=-1$.

It will now be shown that the answer of $-2$ need not be modified during a subsequent operation and may be accumulated into the next operation without any difficulty. To illustrate this point, let us now multiply $+010$ ($+2$) represented by the number A1, times the number $+011$ ($+3$) considered to be the number B1. It will be shown that this product will be simultaneously accumulated to the previous result [$Ri=-6(-0110)$ and $Ci=+4(+0100)$ for a total of $-2$] left in the result and carry registers thus the final answer is $-2+2\times3=+4$. This is shown in Example 5 below.

EXAMPLE 5

| | | 4 | 3 | 2 | 1 | 0 | Product Place | B1 (Multiplier) |
|---|---|---|---|---|---|---|---|---|
| A1 | + | 0 | 0 | 1 | 0 | | | 1 |
| R1 | − | 0 | 1 | 1 | 0 | | | |
| C1 | + | 0 | 1 | 0 | 0 | | | |
| A1 | + | 0 | | 0 | 1 | 0 | | 1 |
| R2 | − | | 0 | 0 | 0 | 0 | 0 | |
| C2 | + | 0 | 0 | 0 | 0 | | | |
| A1 | + | 0 | | 0 | 1 | 0 | | 0 |
| R3 | − | | 0 | 0 | 1 | 0 | 2 | |
| C3 | + | 0 | 0 | 1 | 0 | | | |
| R4 | − | | 0 | 0 | 1 | 1 | 3 | 0 |
| C4 | + | 0 | 0 | 1 | 0 | | | |
| R5 | − | | 0 | 0 | 1 | 1 | 4 | |
| C5 | + | | 1 | 0 | | | | |
| | | | | | | 1 | N | 0 |

Answer−(11 . . . 1100)=+4

In this example, it is assumed that the result digits are shifted to the right as they are formed, and that the carry digits are accumulated in the same place as the input digits. Thus, the digits A1, R1, and C1 (0, 0, 0) appearing in column 1 are combined to form the new digits R2 and C2 (0, 0) in columns 0 and 1, respectively. It will be noted, then, that the product digits appear serially after successive accumulations in column 0 for the successive results.

Each addition of the multiplicand to the previous result as represented by the series of digits R and C is performed in the same manner as in the examples considered above. Thus, in response to the first digit of B1 (multiplier) the multiplicand A1 (0010) is added to series R1−(0110) and C1+(0100). This produces a new result series R2−(0000) and C2+(0000). The answer, it will be noted is advanced to the right so that the R2− digit appearing in column 0 constitutes the least significant digit of the product. This process is repeated for the second multiplier digit to combine A1, R2−, and C2−, to produce the new result and carries series: R3−(0010) and C3+(0010). The second least significant product digit of 0 is also produced at this time. When the multiplier digit is 0, the A1 digits are not shown and only the result and carry digits are combined.

The complete result of this cumulative multiplication is noted to be the number 1 . . . 1100, which is the complement of the binary number 0 . . . 0100. A complemented number results in view of the fact that the result digits are negative, but that the true answer is positive ($+4$ or $+100$). This situation causes no difficulty in view of the fact that by definition the result of any process in accordance with the present invention must bear a sign opposite to the previous operation sign. If, therefore, it had been desired to avoid generating a complementary result, the signs of the numbers could be changed so that the original input numbers would have been $Ai$, $+Ri$, and $-Ci$. This procedure is unimportant, however, in view of the fact that the form of the cumulative result need not be considered until the answer must be read out, and at this time note need only be taken of the sign of the previous operation, and a simple process remains to recomplement the final answer, as it is shifted out serially.

Referring now again to FIG. 1, it should be clear that the unit shown therein operates upon input and previous result and carry digits existing in the same place or column. Thus, in performing Example 1 above, three units of the type shown in FIG. 1 are required, one for each column of the problem. In this utilization of the units, the result signals produced by each unit are fed back to the input circuit thereof after storage, and the carry signals produced by the unit are shifted to the left in order to constitute a carry-over to the next place. The precise manner of utilization of the basic units of the invention, as well as several other examples which will further clarify the features of the invention will be considered below with reference to FIGS. 3, 5a, and 5b.

The basic logical operation of the unit shown in FIG. 1 will be developed in terms of logical algebra which may be derived from a "truth" table as will be discussed below; reference being made first to FIG. 1a where the various possible sign combinations are introduced.

As indicated in FIG. 1a, only four sign possibilities are present in view of the fact that the invention requires the sign of the previous result and carry signals $Ri$ and $Ci$ to be opposite. It will also be noted in FIG. 1a that whenever the operation sign is positive, the new carry signal must also be positive and consequently the new result signal is negative; whereas whenever the operation sign signal is negative, the new carry signal becomes negative and the new result signal is positive.

It will be noted that the sign possibilities shown in FIG. 1a are broken into two groups, namely, those where the sign of the previous carry and the operation sign are the same, and those where the sign of the previous carry and the operation sign are different. It will be noted that where the previous carry and input signals have the same sign, a control signal $K=1$ is shown, whereas where the previous carry and input signals have different signs, the control signal $K=0$ is shown.

The logical derivation of the signals for the unit shown in FIG. 1 may then be derived from the "truth" table, such as is shown in Table 1 below.

*Table 1*

$K=1$

| | Signs (1) | Signs (2) | Total Value | Digit Values | | | | | Signs (1) | Signs (2) | Total Value |
|---|---|---|---|---|---|---|---|---|---|---|---|
| gOs | + | − | | | | | | | − | + Ro | |
| Rj | − | + | ↓ | Aj | Rj | Cj | Ro | Co | + | − Co | ↓ |
| Cj | + | − | | | | | | | | | |
| (1) | | | 0 | 0 | 0 | 0 | 0 | 0 | | | 0 |
| (2) | | | 1 | 0 | 0 | 1 | 1 | 1 | | | 1 |
| (3) | − | + | 1 | 0 | 1 | 0 | 1 | 0 | − | + | 1 |
| (4) | | | 0 | 0 | 1 | 1 | 0 | 0 | | | 0 |
| (5) | + | − | 1 | 1 | 0 | 0 | 1 | 1 | + | − | 1 |
| (6) | + | − | 2 | 1 | 0 | 1 | 0 | 1 | + | − | 2 |
| (7) | | | 0 | 1 | 1 | 0 | 0 | 0 | | | 0 |
| (8) | + | − | 1 | 1 | 1 | 1 | 1 | 1 | + | − | 1 |

*Table 1—Continued*

$K=0$

| | Signs (3) gOs + Rj + Cj − | Signs (4) − − + | Total Value ↓ | Digit Values | | | | | Signs (3) + | Signs (4) − − + Ro + Co | Total Value ↓ |
|---|---|---|---|---|---|---|---|---|---|---|---|
| | | | | Aj | Rj | Cj | Ro | Co | | | |
| (1) | | | 0 | 0 | 0 | 0 | 0 | 0 | | | 0 |
| (2) | − | + | 1 | 0 | 0 | 1 | 1 | 0 | − | + | 1 |
| (3) | + | − | 1 | 0 | 1 | 0 | 1 | 1 | + | − | 1 |
| (4) | | | 0 | 0 | 1 | 1 | 0 | 0 | | | 0 |
| (5) | + | − | 1 | 1 | 0 | 0 | 1 | 1 | + | − | 1 |
| (6) | | | 0 | 1 | 0 | 1 | 0 | 0 | | | 0 |
| (7) | + | − | 2 | 1 | 1 | 0 | 0 | 1 | + | − | 2 |
| (8) | + | − | 1 | 1 | 1 | 1 | 1 | 1 | + | − | 1 |

It will be noted that Table 1 is divided into two sections designated by $K=1$ and $K=0$, respectively. In the section where $K=1$, two sign combinations designated as (1) and (2) are noted. In sign combination (1), the signals gOs, Rj, Cj, Ro, and Co, have the following signs: +−−+−−+. In sign combination (2), these signals have the signs: −+−+−+−. It will be noted that $K=1$ occurs when the signs of Cj and gOs are the same, that is they are either both plus or both minus.

In the section where $K=0$, two sign combinations (3) and (4) are shown as: +−+−−−+ and −−−++−, for signals gOs, Rj, Cj, Ro, and Co. In this situation the signs of Cj and gOs are noted to be opposite. In all cases, whether $K=1$ or $K=0$, the invention specifies that signals Rj and Cj must be of opposite signs, and that signals Ro and Co must be of opposite signs. This sign, of course, is not actually generated but is implied in the state of the signal having a value of 1 or 0.

Table 1 represents all possible binary combinations of the input signals Aj, Rj, and Cj. In this sense it may be referred to as a "truth" table. This table will be considered hereafter as a basic reference for determining the value of binary output digits according to the invention, in the examples which follow. The table has been developed by combining the binary input digits according to their weight and sign to develop a total weight for these digits, the total weight being then represented as the same value by the respective output digits Ro and Co.

Consider, for example, the section of Table 1 where $K=1$ and where sign combinations in group (1) are employed. In row (1) the total value is 0 since all of the input signal Aj, Rj, and Cj are 0, and thus output digits Ro and Co are 0. In this case the signs are not designated.

In row (2) only input signal Cj has a value of 1, and the sign for column (1) is + so that the total value of the input is +1. If sign group (2) were considered the total value in row (1) is −1. The signs of output signals Ro and Co, for the condition $K=1$, will be noted to be the same as those for signals Rj and Cj, considering the respective sign group.

The value of output digits Ro and Co may be determined by observing the sign of the input signals which correspond to the total value. For example, in row (2), the signs + − appears for the total value of binary 1, for sign combinations (1) and (2), respectively. These signs correspond to the sign of Cj which is also the sign of output signal Co. This means that in order to obtain a total value of 1 for the particular combination of input signals it is necessary to generate both a carry signal Co, which has a weight of 2, and a result signal Ro, which has a weight, of the opposite sign, of 1. In other words, for sign combination (1), output signals Ro and Co in row (2) represent: −1+2; and for sign combination (2) these signals represent +1−2, the total value in the first case being +1 and in the second case, for sign combination (2), the total value is −1.

In terms of actual computation, the summation of input signals and the production of output signals may appear as illustrated in the Examples 1a and 2a, below. These correspond to Examples 1 and 2 above, respectively.

EXAMPLE 1A

```
           3  2  1
Ai  +         1
Ri  −            0         Input       Sign Combination (1)
Ci  +            0                           Total Ro  −         1           Output     Ro+Co = −1+2 = +1
Co  +      1
```

EXAMPLE 2A

```
           4  3  2
Ai  +         0
Ri  +            0         Input       Sign Combination (3)
Ci  −            1                           Total Ro  −         1           Output     Ro+Co = −1+0 = −1
Co  +      0
```

In Example 1a, sign combination (1) is present where signals Ai, Ri, and Ci have implied signs of +−− and +, respectively. Since, according to the invention, the new carry, Co, must bear the sign of the operation which is performed upon signal Ai, it is positive. The invention also specifies that the new result signal Ro must bear an implied sign opposite to that of the carry and therefore it is negative. Thus, the total output value is +1, and is accomplished by generating a relative weight signal of −1 for signal Ro and a relative weight signal of +2 for signal Co. It may be observed, that the terms partial result and carry signals, as employed herein, pertain to the binary digits or equivalent signals, which must be combined to generate a total value. Thus, Ro=1 in binary place 2 of Example 1a and Co=1, in binary place 3 of the same example, are partial result and carry digits.

It will be understood that the digit values which are mentioned herein are related to a particular binary place. Thus, the values of −1 and +2 for output signals Ro and Co are referenced to digital position 2, in Example 1a. The carry bears the weight of two since it is to be carried over to the next higher digital place 3, whereas the result bears the weight of 1 in column 2.

Another example as to how binary digits are combined according to the invention is shown in Example 2a above. In this case, sign combination (3) is illustrated where Ai, Ri, and Ci have signs: ++ and −, respectively. The carry output signal, Co, then bears the sign of Ai which is +, and the result signal bears the opposite sign which is −. Reference again to the section of Table 1 where $K=0$ indicates that the combination of 0 0 1 for the input signals Ai, Ri, and Ci, has the total value of −1. This is developed in the output signals through signal Ro=−1 and signal Co=0, referenced to binary place or column 3.

In the examples which are given below, following the derivation of the basic units of the invention, reference will be made again to Table 1 to show how certain output signals are generated. This can be done quite easily, however, without the use of Table 1 by giving the new carry the sign of the operation, and then determining the value which the output signals must assume in order to accomplish the proper total value. Thus if the total input value is −1, and the new carry is to be negative with a positive result digit, both the new carry and the new result digits must be binary 1 to accomplish the desired total value. In a similar manner, if the total value is +1, and the new carry is to be positive, both result and carry digits must again be binary 1.

$$Co = Ri'.(Ci + Ai) + Ci.Ai$$

It may be desirable in some cases to expand the logical expression for the carry signal to a two-level logical form as follows:

$$Co = Ri'.Ci + Ri'.Ai + Ci.Ai$$

The logical definition of the carry output signal for the case where control signal $K=0$, and the previous carry and input signals have opposite signs, may be derived by observing that the carry is binary 1 whenever the previous result signal R$i$ is a binary 1, and either the previous carry is a 0 or the previous input signal is a 1; and signal Co is also 1 if the previous carry C$i$ is a 0 and the input signal is a binary 1. This may be expressed as follows:

$$Co = Ri.(Ci' + Ai) + Ci'.Ai$$

or in two-level logic as follows:

$$Co = Ri.Ci' + Ri.Ai + Ci'.Ai$$

A complete carry signal covering all possible input sign combinations may now be expressed as the logical combination of the two carry signals derived above, separated by the control signals K and K', where the signal K is assumed to be "on" for the condition $K = 1$, and signal K' is assumed to be "on" for the condition $K = 0$. This may be written as follows:

$$Co = K.(Ri'.Ci + Ri'.Ai + Ci.Ai) + K'.(Ri.Ci' + Ri.Ai + Ci'.Ai)$$

Table 1 may be used to derive a different set of logic for the carry Co. Specifically, it is to be noted that when A$i$ is 1 and R$i$ and C$i$ are alike, i.e., both are 0 or both are 1, Co is 1. This takes care of Co for either $K = 1$ or $K = 0$ in the second and last rows of digits shown in Table 1. For $K = 1$, the 1's for Co in the third and fourth rows correspond to the conditions for $Ri = 0$ and $Ci = 1$. Similarly, for the 1's in the Co column for the condition $K = 0$ in the fifth and sixth rows, the conditions that $Ri = 1$ and $Ci = 0$ are true. Thus, Co may alternatively be represented in a different set of logic as follows:

$$Co = Ai.(Ri'.Ci' + Ri.Ci) + K'.Ri.Ci' + K.Ri'.Ci$$

At this point note must be taken of the fact that the algebraic expressions above do not necessarily constitute particular circuit mechanization definitions since the various cases where the basic unit of the invention may be employed must each be considered separately. The reason for this will become apparent as various different utilizations of the arithmetic unit are introduced below. Accordingly, it will be understood that the logical algebra introduced above is in no way intended to constitute a particular definition of the invention, but rather to define a generic class of logical structure. Thus, the expressions for the result and carry are intended to be generic to a multitude of other forms which may be derived therefrom by well known algebraic techniques.

Since the sign of the carry input signal was determined by the previous operation sign Os, it may be stated that the control signal K assumes a binary 1, or "on" state whenever the previous and present operation sign signals are the same. In a similar manner, it may be stated that the control signal K becomes binary 0 or "off" whenever the previous and present operation signals are different. It will be understood, however, that the definition of control signal K in terms of the previous carry and present operation sign is equally applicable.

If it is assumed, then, that each operation sign signal is to be entered into a storage device, such as a flip-flop, and that this device includes 1-setting and 0-setting circuits, referred to hereafter as 1Os and 0Os, respectively, then signal K may be defined as follows:

$$K = Os.(0Os)' + Os'.(1Os)'$$

This expression may be interpreted as stating that signal K is 1 if a previous operation sign $Os = 1$ is stored in a flip-flop or other storage device, and if this storage device is now to remain in the "on" or 1 state, since no signal is to be applied to its 0-setting input circuit [as indicated by the condition $(0Os)' = 1$]. The other condition for signal 1 being equal to K occurs when the previous operation sign Os is stored in a flip-flop or other storage device is a 0, as indicated by $Os' = 1$, and no signal is to be applied to the storage device to set it to 1, this latter condition being indicated by the expression $(1Os)' = 1$.

In one form of mechanization, then, the signals K and K' may be derived through a complementary amplifier driven by a logical network mechanized in accordance with the above equation. This type of mechanization is employed for multiplication and division, as shown below. It may be desirable, however, in other situations, to employ a flip-flop to store signals K and to generate the complemented control signals K and K'. In this situation, provision must be made for resetting the flip-flop to 0 in response to the condition:

$$0K = Os.(0Os) + Os'.(1Os)$$

The 0-setting condition, it will be noted, indicates that $K = 0$ whenever the previous and present operation signs differ.

The general logical expressions derived above are shown in a general mechanized form in FIG. 2 as another mode of expression rather than as a particular example of utilization. In FIG. 2 each "and" function is generated through an "and" circuit shown as a semi-circular drawing representation with a dot in the center. Thus, the logical "and" terms $Ai'.Ri'.Ci'$, $Ai.Ri'.Ci'$, $Ai'.Ri.Ci'$, $Ai'.Ri'.Ci$ are provided by "and" circuits 21, 22, 23 and 24 producing the corresponding output signals. The signals of "and" circuits 21–24 are then combined through an "or" circuit 25, all "or" circuits being shown as semi-circular drawing representation with a plus (+) in the center thereof.

It will be noted in FIG. 2 that result signal Ro is produced independently of the condition of the control signal K, but that two different carry signals are produced, being combined under the control of the signals K and K' to form a complete carry Co.

The arrangement of FIG. 2 shows the utilization of a storage flip-flop producing signals K and K' so that both 1-setting and 0-setting logic must be employed, as discussed above. The particular logic for entering the operation sign into storage device Os is not shown since this logic varies with each utilization of the invention.

Reference is now made to FIG. 3 wherein a system for the parallel accumulation of positive or negative numbers by either addition or subtraction is shown, provision being also made for combining the result and carry signals in a final serial operation to form a complete result. As indicated in FIG. 3, the system includes an input number register consisting of a plurality of storage elements A1 . . . A$j$ . . . A$n$ for receiving the number, and a storage element As for receiving the sign of the input number. Control signals Su and Ad representing operations of subtractions and addition, respectively, are also received by the system and applied to gating circuit gOs controlling operation sign storage device Os. The system also includes a result register including storage devices R1 . . . R$j$ . . . R$n$ and a carry register including carriage storage devices C1 . . . C$j$ . . . C$n$. The input, result, and carry digits are applied to respective full adder-subtracters FASI . . . FASJ . . . FAS$_n$ which are mechanized the same as the unit shown in FIG. 2 in accordance with the first basic logic introduced above and are controlled by signals K and K' produced by device K. At the termination of each accumulation operation, which consists of the successive combination of a plurality of input numbers A to the previous partial result and carry signals, the result and carry signals are shifted right under the control of a shift control device X, and are applied to a full subtracter unit FS which produces a series of output signals corresponding to the accumulated total result. Full subtracter FS produces a series of carry signals which are stored in storage device Cs being applied thereto through a gating circuit gCs. It will be shown that the storage logic for full subtracter FS may be the same as that part of the logic included in full adder-subtracters FAS during the control condition where signal $K = 1$.

The particular details specifying the structure for shift control circuit X and various means for synchronizing the operation of this device with the control signal inputs are not shown and will not be discussed since such arrangements are now well known in the art. The novel features of the invention reside entirely in the manner in which partial result and carry signals are accumulated. Various types of prior art circuits are available for adding two binary series through a shifting operation in order to develop a single output binary series or presenting the sum or difference of the two binary numbers.

The operation of the system shown in FIG. 3 may best be illustrated by considering a few specific examples, as shown below. In Examples 6 and 7 the numbers −5, +3, and +4 are accumulated, all numbers being represented in complementary form to illustrate a different type of operation, so that −5 is expressed as the binary number +1011, +3 is expressed as the binary number −1101, and +4 is the binary number −1100. A simple way of interpreting complemented binary numbers is to consider the most significant place as having a sign opposite to the other places. Thus, binary weights are given to the successive columns as 8, 4, 2 and 1, so that the number +1011 may be considered to be −1000 +011 or −8+3=−5. In a similar manner, the binary number −1101 may be expressed as +1000 −101 or +8−5=+3.

Example 7, shown below, performs the same operation, namely, −5+3+4=2, but all numbers therein are in absolute value plus sign. In this case, the operation sign is a function of the sign of the input number A$i$ as well as the accumulation sign. Thus, it will be noted that when operation sign O$s$ appears as minus, it may have been either a plus number which is subtracted, or a minus number which is added; whereas if the operation sign is plus, it may indicate either that a minus number is subtracted or that a plus number is added.

Examples 8 and 9, shown below, are similar to Examples 6 and 7 in that the same numbers are employed but the signs are reversed. This example is +5−4−3=−2.

```
    EXAMPLE 6                        EXAMPLE 7

K   Os        8 4 2 1           K   Os        8 4 2 1
    +    A1  1 0 1 1    −5          −    A1  0 1 0 1
0       +R1  0 0 0 0           1        +R1  0 0 0 0
        −C1  0 0 0 0                    −C1  0 0 0 0

−    A2  1 1 0 1    +3          +    A2  0 0 1 1
0       −R2  1 0 1 1           0        +R2  0 1 0 1
        +C2  0 1 1 0                    −C2  1 0 1 0

−    A3  1 1 0 0    +4          +    A3  0 1 0 0
1       +R3  0 0 0 0           1        −R3  1 1 0 0
        −C3  0 0 1 0                    +C3  1 0 1 0

+R4  1 1 1 0                    −R4  0 0 1 0
        −C4  1 1 0 0                    +C4  0 1 0 0

0 0 1 0    +2                   0 0 1 0

EXAMPLE 8                        EXAMPLE 9

K   Os        8 4 2 1           K   Os        8 4 2 1
    −    A1  1 0 1 1    +5          +    A1  0 1 0 1
1       +R1  0 0 0 0           0        +R1  0 0 0 0
        −C1  0 0 0 0                    −C1  0 0 0 0

+    A2  1 1 0 1    −3          −    A2  0 0 1 1
0       +R2  1 0 1 1           0        −R2  0 1 0 1
        −C2  0 1 1 0                    +C2  1 0 1 0

−    A3  0 1 0 0    −4          −    A3  0 1 0 0
0       −R   0 0 0 0           1        +R3  1 1 0 0
        +C3  0 0 1 0                    −C3  1 0 1 0

+R4  0 1 1 0                    +R4  0 0 1 0
        −C4  1 0 0 0                    −C4  0 1 0 0

1 1 1 0    −2                   1 1 1 0
```

While, for the most part, Examples 6 through 9 are similar to Examples 1 through 4, indicated above, a few important distinctions should be noted. In the first place, it is important to note that where complementary numbers may be allowed, the most significant place must be reserved for a binary digit having a sign opposite to the remainder of the number. This means that arithmetic computation must not be performed in the most significant place. To be further particular, it will be noted that in Example 7, where no complementary numbers are employed, the 8-weight place includes all zeros at the start, and that no addition or subtraction is performed which requires an arithmetic total result having a digit in this place. Thus, in Example 6, any digit in the 8-weight place results from the use of complementary numbers, and is not confused with the arithmetic computation.

Referring to Example 6, in particular, the addition of the signals A1 and R1 in the 8-weight place results in an answer of −1, which is expressed as a binary 1 in the 8-weight place for signal −R2. Then, when signals A2 and R2 in the 8-weight place are added, it must be recalled that the most significant A2 digit is positive, the lower place digits being negative, whereas all of the R2 digits are negative. This results then in a zero result digit R3 in the same place. However, although for explanatory purposes only, it is helpful to note the sign of the most significant digit, in any case the logic for combining all digits is always the same.

The partial accumulation may be noted after each operation. For example, after −5 is accumulated, the signals R2 and C2 will represent the numbers −11 and +6, respectively, corresponding to the entry of a −5. After the accumulation of −5 and +3, it will be noted that signals R3 are all zero and signals C3 represent a −2. Finally, the last result is R3 equal to +14 and C4 equal to −12 so that the total result, subtracting C4 from R4 is a +2.

In Example 7 the first accumulation results in the number R2 equal to +5 and C2 equal to −10 corresponding to the entry of −5; the second accumulation results in the number R3 equal to −12 and C3 equal to +10 for a total result of −2; and the final accumulation results in R4 equal to −2 and C4 equal to +4 for a total result of +2.

It is believed that Examples 8 and 9 may be readily followed from the above discussion particular note being taken of the fact that an answer of −2 results where the negative carry signals are greater than the positive result signals.

It is helpful in analyzing the logical operation of the invention to consider various logical steps in Examples 6 through 9. In Example 6, for example, it will be noted that the signals A1, R1 and C1 in column 1 are 1, 0, and 0, respectively, and that control signal K is a 0. Referring again to Table 1, and in particular to the section designated by control signal K=0, it will be noted that where the same combination of binary values occurs for signal A$i$, C$i$ and R$i$, the output signals R$o$ and C$o$ are both binary 1. This, then, corresponds to the digits of R2 and C2 in columns 1 and 2, respectively, of Example 6. In terms of the result logic, the digit R2 occurs upon satisfaction of the condition $Ri'.Ci'.Ai=1$. The carry output signals is caused by satisfying the logical condition $Ci'.Ai=1$.

Another typical example of the logical operation of the invention is found in the transformation of the input signals A2, R2 and C2 in column 1 of Example 6 which are 1, 1 and 0, respectively, into the output signals R3 and C3 in columns 1 and 2, the output signals being 0 and 1, respectively. It will be noted that K is equal to 0 again and reference to the corresponding portion of Table 1 indicates that the correct result has been formed. In terms of the logic, the result signal is 0 since none of the conditions of the result logic are satisfied, and the carry-over signal is 1 since the condition $Ri.Ai=1$ has been satisfied.

A similar logical operation may be made where the control signal $K=1$ as, for example, where signals A3, R3 and C3 have the values 1, 0, and 0 in column 4 of Example 6, the result thereof being $R4=1$ and $C4=1$. This corresponds to Table 1 and illustrates the case where the result condition $Ri'.Ci'.Ai=1$ is satisfied and the carry condition $Ri'.Ai=1$ has been satisfied.

The logical progression of control signal K should also be noted. It will be observed that whenever the operation sign signal $Os$ changes from a plus to a minus or from a minus to a plus, the following control signal is a zero; whereas whenever signal $Os$ is a plus and remains a plus or is a minus and remains a minus, the following control signal K is a 1. It will also be observed that signal K may be defined by noting the comparison between the present signal $Os$ and the carry input signal sign. If these signs are different, K is equal to 0, if they are the same, K is equal to 1. It will be understood, therefore, that either definition of signal K is suitable and further that two basic types of circuit mechanization are possible. These two logical definitions for signal K must occur in view of the fact that each new carry signal bears the sign of the previous operation sign so that effectively the comparison between the present operation sign and the present carry sign is really a comparison between the present operation sign and the previous operation sign.

It will be understood that while in Examples 6 through 9 only four binary digits are shown and only three accumulations are illustrated, in fact the invention most likely will be employed with binary numbers in the order of magnitude of 20 significant digits, or more, and that accumulations of ten or more input numbers is certainly feasible. The only limitation in any accumulation process is the capacity of the accumulation register.

It will be recognized that the accumulation process introduced above is performed without cascading any carries from one place to the next, since no carry is formed as a function of any carry other than that in the same place.

After completing the accumulation as in Examples 6 through 9, the complete result may be formed by serially combining the accumulated result digits and carry digits through a full subtracter. One manner of accomplishing this is to employ a subtracter of the type which is utilized when control signal K is equal to 1. It will be recalled that in this case the carry input signals and the input digits have the same sign and the previous result and input digits have different signs. This type of full subtracter may be employed by considering the accumulated carry signals referred to hereafter as $Co$ to constitute a serial input number, and the accumulated result signals referred to hereafter as $Ro$, as a previous result series. In performing a serial subtraction upon $Co$ and $Ro$ to form the series of digits $Rt$ representing the total result, a carry series $Cs$ is generated. The signal series $Rt$ and $Cs$ are defined as follows:

$$Rt = Ro.Co.Cs + Ro.Co'.Cs' + Ro'.Co.Cs' + Ro'.Co'.Cs$$
$$Cs = Ro'.(Cs+Co) + Cs.Co$$

The carry logic $Cs$ may be entered into a flip-flop in accordance with simplified 1-setting and 0-setting functions as follows:

$$1Cs = Ro'.Co$$
$$0Cs = Ro.Co'$$

The operation of this type of subtracter may be illustrated by considering the manner in which the various results of Examples 6 through 9 are combined, as shown in Examples 6a through 9a, respectively:

EXAMPLE 6A

|  | ←—t |  |  |  |
|---|---|---|---|---|
| +Ro | 1 | 1 | 1 | 0 |
| −Co | 1 | 1 | 0 | 0 |
| −Cs | 0 | 0 | 0 | 0 |
| +Rt | 0 | 0 | 1 | 0 | =+2

EXAMPLE 7A

|  | ←—t |  |  |  |
|---|---|---|---|---|
| −Ro | 0 | 0 | 1 | 0 |
| +Co | 0 | 1 | 0 | 0 |
| +Cs | 1 | 1 | 0 | 0 |
| +Rt | 1 | 1 | 1 | 0 | =−2

EXAMPLE 8A

|  | ←—t |  |  |  |
|---|---|---|---|---|
| +Ro | 0 | 1 | 1 | 0 |
| −Co | 1 | 0 | 0 | 0 |
| −Cs | 1 | 0 | 0 | 0 |
| +Rt | 1 | 1 | 1 | 0 | =−2

EXAMPLE 9A

|  | ←—t |  |  |  |
|---|---|---|---|---|
| +Ro | 0 | 0 | 1 | 0 |
| −Co | 0 | 1 | 0 | 0 |
| −Cs | 1 | 1 | 0 | 0 |
| +Rt | 1 | 1 | 1 | 0 | =−2

It will be noted that in Examples 7a, 8a and 9a, the result appears in complementary form so that it must be subtracted from zero in order to obtain an absoluted number. The sign of the complete result is therefore opposite to that indicated as the sign of the series $Rt$. In Example 6a the result of +2 is generated as the absoluted binary value series, whereas in Example 7a a complementary series is generated as indicated by a binary 1 in the most significant or leftmost digit position. The full subtracter just described may be employed where numbers are stored as absolute value plus sign in a memory device, if an additional word time interval is utilized to recomplement numbers in complementary form by subtracting from zero. The sign of the answer is the same as the sign of the result series, unless the most significant digit indicates a complementary number, in which case the true sign is opposite to that of the result series.

A serial subtracter is thus provided wherein a single set of logic is operative for either subtractive case: $Co-Ro$ or $Ro-Co$. Thus, it will be understood that the basic unit of the invention is important for serial usage as well as for the serial-parallel or parallel usage.

Reference is now made to FIG. 4 where the general form of logic of the unit for the various places of the parallel add-subtract unit of FIG. 3 is shown. It will be noted in FIG. 4 that the carry network logic is different from that of FIG. 2.

It is in fact mechanized from the preferred and simplified logic:

$$Co = Rj.Aj.Cj + Rj'.Aj.Cj' + Rj'.K.Cj + Rj.K'.Cj'$$

The result logic, however, is somewhat simplified in view of the fact that in parallel accumulation, each result signal is formed as a function of a previous result signal in the same place. When logical storage elements, such as flip-flops, are utilized, this means that the state of the flip-flop, or other storage device, need not be changed if it is already in the state required for the next logic. In terms of logic, this means that the normal result logic may be simplified by substituting a zero for each term $Ri$ and a one for each term $Ri'$ to define the 1-setting control signal for a flip-flop. Thus, assuming a flip-flop $Rj$ which is to receive the $j$th result signal, and that the flip-flop has 1 and 0 input circuits definable as $1Rj$ and $0Rj$, respectively, the input logic may be expressed as follows:

$$1Rj = (Aj.Cj' + Aj'.Cj)Rj'$$
$$0Rj = (Aj.Cj' + Aj'.Cj)Rj$$

This expression may also be considered to be a half sum in terms of the input number and carry. It will also be noted in FIG. 4 that a particular form for the input logic of a storage device $Os$ is shown which may be expressed logically as follows:

$$1Os = Su.As' + Ad.As$$
$$0Os = Su.As + Ad.As'$$

This logic indicates that the operation sign is to be represented as a binary 1, indicating a minus (−) operation whenever the operation to be performed is addition, represented by a control signal $Ad$, and the sign of the input number is negative, represented by the signal $As=1$, whenever a subtraction is to be performed, indicated by the control signal $Su$, and the sign of the input member is positive, indicated by signal $As'=1$. The complementary condition for the operation sign should be apparent from this explanation.

In referring to FIG. 4 it will be noted that each "and" function of the above expression is mechanized by means of an "and" circuit which may be of a conventional type being represented by a semi-circular enclosure with a dot (.) therein. Thus signals $Su$ and $As'$ are applied to an "and" circuit in gate $gOs$ of FIG. 4 and signals $Ad$ and $As$ are applied to another "and" circuit. The output signals of these two "and" circuits are combined in an "or" circuit designated as a semi-circular enclosure with a plus sign (+) therein. This then develops the function $1Os$, and an amplifier is employed to invert signal $1Os$ to develop its complement $1Os'$ which is used in other logic. Signal $1Os$ is passed through the amplifier uninverted and is supplied to the corresponding input circuit of device $Os$.

The manner in which the various signal entries may be accomplished during respective computing intervals through the means of well-known types of synchronizing circuits will not be discussed since this technique forms no part of the present invention and can be readily supplied by those skilled in the art.

The result and carry logic shown in FIG. 4 is modified to introduce the right shifting operation required to apply signals $Ro$ and $Co$ to the full subtracter FS. In general terms and in terms of a right shifting control signal X, this shift function may be expressed as follows:

$$1Rj = gRj.X + Rj + 1.X'$$
$$0Rj = gRj'.X + Rj + 1'.X'$$
$$1Cj+1 = gCj.X + Cj + 2.X'$$
$$0Cj+1 = gCj'.X + Cj + 2.X'$$

The above general terms define an operation such that, when signal X equals 1, functions $gRj$ and $gCj$ (further defined below) are entered into flip-flops $Rj$ and $Cj$, respectively. When $X'$ is equal to 1, shifting is performed since the logic specifies that each flip-flop receives the signals from the next higher place flip-flop. Thus if $j$ is equal to 1 flip-flop R1 receives output signal R2 of flip-flop R2 and flip-flop C2 receives output signal C3 from flip-flop C3. The specific connections of FIG. 4 may be determined from the discussion which follows, but will not be reviewed in detail since the manner in which logic is interpreted in terms of structure is now fully understood by those skilled in the computing art.

In other respects, the logic for the unit employed in a parallel accumulator is similar to that introduced above in the basic logical discussion and therefore will not be described further. A complete set of logic for the various units in FIG. 4 is summarized as follows:

$$1Rj = (Aj.Cj' + Aj'.Cj)Rj'.X + Rj + 1.X'$$
$$0Rj = (Aj.Cj' + Aj'.Cj)Rj.X + Rj + 1'.X'$$
$$Cj+1 = [K.(Rj'.Co + Rj'.Aj + Cj.Aj) + K'.(Rj.Cj' + Rj.Aj + Cj'.Aj)].X + Cj + 2.X'$$
$$1Os = Su.As' + Ad.As$$
$$0Os = Su.As' + Ad.As'$$
$$1K = Os.(0Os)' + Os'.(1Os)'$$
$$0K = Os.(0Os) + Os'.(1Os)$$

Reference is now made to FIGS. 5a and 5b showing two alternate systems for performing serial-parallel multiplication in accordance with the present invention. Considering FIG. 5a in particular, it will be noted that the multiplicand is entered into a register including storage devices $A1 \ldots Aj \ldots An$, the digits thereof being transferred through a plurality of gating circuits $$gA1 \ldots gAj \ldots gAn$$

to a partial product register including a plurality of full adder-subtracters mechanized in accordance with the principles introduced above. In operation, the multiplicand is added to the previous partial product stored in the partial product register. The manner in which the first digit in the multiplicand is combined with its corresponding digits in the other registers will then be determined by both the multiplier digit value and sign, and also the accumulation sign for the particular product. As in the other cases where the unit of the invention is employed, control signals K and K' determine which of the two types of carries are formulated in the various full adder-subtracters. A serial product passes through the least significant register place, referred to as $Ro$, during two successive $n$-digit time intervals, starting with the least significant product digit. It will be noted that each product digit is shifted forward through the corresponding full adder-subtracter as it is formed to a corresponding result digit storage stage.

The embodiment of FIG. 5b operates on a somewhat different principle from that shown in FIG. 5a in that the full adder-subtracter signals are only employed when the multiplier digit is a binary 1. When the multiplier digit is a zero, the partial result and carry signals are shifted to the right and applied to a full subtracter FS. Thus, in the embodiment of FIG. 5b, the signals of full adder-subtracters FAS1 . . . FAS$j$ . . . FAS$n$ are applied to "and" circuits 51a . . . 5ja . . . 5na, respectively. These "and" circuits pass the full adder-subtracter signs in response to signal $Sx$ produced by a device $Sx$ which serially receives the multiplier digit signals. The result digit signals are shifted to the right through "and" circuits 51b . . . 5jb . . . 5nb controlled by signal $Sx'$ produced by device $Sx$, whenever the multiplier digit signal applied thereto is a zero. In this manner, the multiplicand is accumulated to the previous partial product when the multiplier digit is a binary 1 and the partial result and carry signals are shifted forward to full subtracter FS when the multiplier digit is zero.

The shifting of the carry signals is controlled by a flip-flop CX, which is assumed to be in an "on" state whenever the multiplier digit is zero and right shifting is to be performed, and to assume a zero state whenever the multiplier digit is a one and the normal carry function is to be entered into the associated flip-flop. However, unless other shifting functions are involved, this function may be performed simply by the use of signals $Sx$ and $Sx'$.

An additional carry storage flip-flop $Co$ is introduced so that full subtracter FS combines input signals $Ro$ and $Co$ to produce the complete product, carries $Cs$ being generated by device FS and stored in device $Cs$.

The manner in which multiplication is performed in accordance with the basic principles of the present invention is shown in Examples 10 through 13.

EXAMPLE 10

$+(+5) \times (-6) + 5 = -25$

| K | Os | | 4 | 3 | 2 | 1 | 0 | B1 |
|---|---|---|---|---|---|---|---|---|
|   | — | A1 | 0 | 1 | 1 | 0 |   |   |
| 0 |   | −R1 | 0 | 0 | 0 | 1 |   | 1 |
|   |   | +C1 | 0 | 1 | 1 | 0 |   |   |
|   | — | A2 | 0 | 0 | 0 | 0 |   |   |
| 1 |   | +R2 |   | 0 | 0 | 0 | 1 | 0 |
|   |   | −C2 | 0 | 0 | 0 | 1 |   |   |
|   | — | A3 | 0 | 1 | 1 | 0 |   |   |
| 1 |   | +R3 |   | 0 | 0 | 0 | 1 | 1 |
|   |   | −C3 | 0 | 0 | 0 | 1 |   |   |
|   | — | A4 | 0 | 0 | 0 | 0 |   |   |
| 1 |   | +R4 |   | 0 | 1 | 1 | 1 | 0 |
|   |   | −C4 | 0 | 1 | 1 | 1 |   |   |
|   | — | A5 | 0 | 0 | 0 | 0 |   |   |
| 1 |   | +R5 |   | 0 | 1 | 0 | 0 | 0 |
|   |   | −C5 | 0 | 1 | 0 | 0 |   |   |
|   | — | A6 | 0 | 0 | 0 | 0 |   |   |
| 1 |   | +R6 |   | 0 | 1 | 1 | 0 | 0 |
|   |   | −C6 | 0 | 1 | 0 | 0 |   |   |
|   | — | A7 | 0 | 0 | 0 | 0 |   |   |
| 1 |   | +R7 |   | 0 | 1 | 1 | 1 | 1 |
|   |   | −C7 | 0 | 1 | 0 | 0 |   |   |

EXAMPLE 11

$+(+5)\times(-6)+5=-25$

| K | Os |  | 4 | 3 | 2 | 1 | 0 | Rt | B1 |
|---|----|----|---|---|---|---|---|----|----|
|   | −  | A1 | 0 | 1 | 1 | 0 |   |    |    |
| 0 |    | −R1| 0 | 0 | 0 | 1 |   |    | 1  |
|   |    | +C1| 0 | 1 | 1 | 0 |   |    |    |
|   |    |    |   |−Cs| 0 |   |   |    |    |
| 1 |    | +R2| 0 | 0 | 0 | 1 | 1 | 0  |    |
|   |    | −C2| 0 | 0 | 0 | 1 | 0 |    |    |
|   |    | A3 | 0 | 1 | 1 | 0 | 0 | Cs |    |
| 1 |    | +R3| 0 | 0 | 0 | 0 | 1 | 1  |    |
|   |    | −C3| 0 | 0 | 0 | 0 | 1 |    |    |
|   |    |    |   |−Cs| 1 |   |   |    |    |
| 1 |    | +R4| 0 | 1 | 1 | 0 | 1 | 0  |    |
|   |    | −C4| 0 | 1 | 1 | 0 | 0 |    |    |
|   |    |    |   |−Cs| 1 |   |   |    |    |
| 1 |    | +R5| 1 | 0 | 1 | 1 | 0 | 0  |    |
|   |    | −C5| 0 | 1 | 1 | 0 |   |    |    |
|   |    |    |   |−Cs| 0 |   |   |    |    |
| 1 |    | +R6|   | 0 | 1 | 0 | 0 |    |    |
|   |    | −C6|   | 0 | 1 | 1 |   |    |    |
|   |    |    |   |−Cs| 0 |   |   |    |    |
| 1 |    | +R7|   |   | 0 | 1 |   |    |    |
|   |    | −C7|   |   | 0 | 1 |   |    |    |

Answer 1 0 0 1 1 1 = −25

EXAMPLE 12

$+(-3)\times(-7)-2=+19$

| K | Os |    | 4 | 3 | 2 | 1 | 0 | B1 |
|---|----|----|---|---|---|---|---|----|
|   | +  | A1 | 1 | 1 | 0 | 1 |   |    |
| 1 |    | −R1| 0 | 1 | 1 | 1 |   | 1  |
|   |    | +C1| 0 | 1 | 0 | 1 |   |    |
|   | +  | A2 | 0 | 0 | 0 | 0 |   |    |
| 1 |    | −R2| 0 | 1 | 1 | 1 | 1 | 0  |
|   |    | +C2| 0 | 1 | 0 | 1 |   |    |
|   | +  | A3 | 0 | 0 | 0 | 0 |   |    |
| 1 |    | −R3| 0 | 0 | 1 | 0 | 0 |    |
|   |    | +C3| 0 | 0 | 0 | 0 |   |    |
|   | −  | A4 | 1 | 1 | 0 | 1 |   |    |
| 0 |    | −R4| 0 | 0 | 0 | 1 | 1 |    |
|   |    | +C4| 0 | 0 | 0 | 0 |   |    |
|   | −  | A5 | 0 | 0 | 0 | 0 |   |    |
| 0 |    | +R5| 1 | 1 | 0 | 1 | 0 |    |
|   |    | −C5| 0 | 1 | 0 | 1 |   |    |
|   | −  | A6 | 0 | 0 | 0 | 0 |   |    |
| 0 |    | +R6| 0 | 1 | 1 | 0 |   |    |
|   |    | −C6| 0 | 0 | 0 | 1 |   |    |
|   |    | +R7| 0 | 0 | 0 | 0 |   |    |
|   |    | −C7| 0 | 0 | 0 | 0 |   |    |

EXAMPLE 13

$+(-3)\times(-7)-2=+19$

| K | Os |    | 4 | 3 | 2 | 1 | 0 | Rt | B1 |
|---|----|----|---|---|---|---|---|----|----|
|   | +  | A1 | 1 | 1 | 0 | 1 |   |    |    |
| 1 |    | −R1| 0 | 1 | 1 | 1 |   |    | 1  |
|   |    | +C1| 0 | 1 | 0 | 1 |   |    |    |
|   | +  |    |   |+Cs| 0 |   |   |    |    |
| 1 |    | −R2| 1 | 1 | 1 | 1 | 0 |    |    |
|   |    | +C2| 0 | 1 | 0 | 1 | 0 |    |    |
|   | +  |    |   |+Cs| 0 |   |   |    |    |
| 1 |    | −R3| 0 | 1 | 1 | 1 | 0 | 0  |    |
|   |    | +C3| 0 | 0 | 1 | 0 | 1 |    |    |
|   | −  | A4 | 1 | 1 | 0 | 1 | 0 | ←−+Cs |  |
| 0 |    | −R4| 0 | 0 | 1 | 1 | 1 | 1  |    |
|   |    | +C4| 0 | 0 | 0 | 1 | 0 |    |    |
|   |    |    |   |+Cs| 0 |   |   |    |    |
| 0 |    | +R5| 1 | 1 | 0 | 1 | 1 | 0  |    |
|   |    | −C5| 0 | 1 | 0 | 1 | 0 |    |    |
|   |    |    |   |−Cs| 0 |   |   |    |    |
| 0 |    | +R6| 0 | 1 | 1 | 0 | 1 | 0  |    |
|   |    | −C6| 0 | 0 | 1 | 0 | 1 |    |    |
|   |    |    |   |−Cs| 1 |   |   |    |    |
|   |    | +R7| 0 | 0 | 1 | 1 | 0 |    |    |
|   |    | −C7| 0 | 0 | 0 | 1 | 0 |    |    |

Answer $\overset{+\,+\,+\,-\,-\,-}{0\;1\;1\;1\;0\;1}$ = +25 −5 = +19

Examples 10 and 11 illustrate the solution of the same cumulative multiplication problem utilizing the embodiments of FIGS. 5a and 5b, respectively. In Example 10 the multiplicand is the number A (6=0110). Since it is to be subtracted as multiplied, the sign Os is minus. The number B1 shown vertically adjacent to successive sets of the numbers A, R, and C, is the multiplier and is noted to be the binary number 101 or 5. The previous remainder, left over from another operation, is noted to comprise the number R1=−1 and C1=+6(0110) the total of which is +5. In Example 10 the multiplicand is effectively a series of zeros whenever the multiplier digit is zero in view of the gating operation of "and" circuits gA1 . . . gAj . . . gAn. In Example 10, then, the full adder-subtracters operate continuously in the same manner as in addition and subtraction discussed above except that the result digits are shifted ahead as formed, and the carry digits remain in the same place. Thus, it will be noted that the digits A1, R1 and C1 in column 1 (0, 1, 0), combine to form the result digit R2 equal to 1 in column 0, and carry digit C2 equal to 1 in column 1. The answer appears in complementary form since the most significant digit is a binary 1 and represents the number −25.

In Example 11 no multiplicand digits are shown at such times as the multiplier digit is zero. In this case, the result and carry registers are shifted to the right and the result series Rt is formed through full subtracter FS which generates carry signals Cs. It will be noted that the carry digits in column 0 for C4 must be reset to zero after a multiplier digit of 1 appears, since the carry signal remaining is left over from a previous shifting operation which applies only to the case when the multiplier digit is zero. Thus, when a multiplier digit of 1 appears all carrys are generated through the full adder-subtracters. In other respects, the operation of the various arithmetic units is the same for both embodiments shown in FIGS. 5a and 5b.

Examples 12 and 13 illustrate the operation of serial-parallel multipliers according to the present invention when complementary numbers are employed, and correspond to the operation of the embodiments of FIGS. 5a and 5b, respectively.

As in the case where complementary numbers are added and subtracted, note must be taken of the opposite sign of the input digit A$i$ in its most significant place. Thus, the number −3 represented as the binary number 1101 is considered to have a positive operation sign during the time the least significant multiplier digits are applied, but the most significant digits thereof are negative. Consequently, the combination of the input digits A1, R1 and C1 in column 4 results in an answer of −1 so that digit R2 in column 3 is a 1 and digits C2 in column 4 is a 0.

It will be noted that the operation sign signals change from plus (+) to minus (−) after receipt of the most significant multiplier digit. The reason for this is that the multplier (−7) appears in complementary form as 1001, which is −8 +1, so that the result digits formed after the most significant binary 1 is received have signs opposite to those formed during the entering of the least significant multiplier digit. Thus, the answer is $$\overset{+\,+\,+\,-\,-\,-}{0\;1\;1\;1\;0\;1}$$

which is equal to +24 −5 or +19.

Two forms of result and carry logic will be shown below corresponding to the structure for the embodiments of FIGS. 5a and 5b. Accordingly, the logical definitions will be prefaced by the symbols (5a) and (5b), respectively, to indicate the desired correspondence.

The result logic for the embodiments of FIG. 5a is based upon a gated series of digits A1 . . . Aj . . . An so that, considering the multiplier digits as being represented by symbol M, each input digit to a result network may be represented as (M.Aj). Thus, in the embodiment of FIG. 5a the input logic for flip-flop Rj−1 may be represented as follows:

(5a) to $Rj-1 = (M.Aj).Rj.Cj + (M.Aj).Rj'.Cj'$
$\qquad + (M.Aj)'.Rj.Cj' + (M.Aj)'.Rj'.Cj$ In the result network for the embodiment of FIG. 5b, the result function is continuously formed and either shifted into flip-flop $Rj-1$ under the control of signal $Sx$, or the full adder-subtracter is effectively bypassed under the control of signal $Sx'$ in which case signal $Rj$ is shifted into flip-flop $Rj-1$. The logic for this approach is specified as follows:

(5b) to $Rj-1 = Sx.(Aj.Rj.Cj + Aj.Rj'.Cj' + Aj'.Rj.Cj' + Aj'.Rj'.Cj) + Sx'.Rj$

In a similar manner the carry logic may appear in either of two general forms as follows:

(5a) to $Cj = K.[Rj'.Cj + Rj'.(M.Aj) + Cj.(M.Aj)] + K'.[Rj.Cj' + Rj.(M.Aj) + Cj'.(M.Aj)]$ (5b) to $Cj = Cx'.[K.(Rj'.Cj + Rj'.Aj + Cj.Aj) + K'.(Rj.Cj' + Rj.Aj + Cj'.Aj)] + Cx.Cj + 1$

It will be noted, however, that each carry function is written in terms of the previous carry signal stored in the corresponding flip-flop. Thus, a simplification is possible in view of the nature of the flip-flop in that no signal need be applied to the flip-flop to change its state if it is already in the state desired. For this reason, $Cj$ is an expression for $1Cj$ may be set equal to zero, and $Cj'$ may be set equal to zero in an expression for $0Cj$ as follows for both cases (5a) and (5b):

(5a) $1Cj = K'.[Rj.Cj' + Rj.(M.Aj) + Cj'.(M.Aj)] + K.Rj'.(M.Aj)$
$0Cj = K'.[Cj.(M.Aj)' + Cj.Rj' + Rj'.(M.Aj)'] + K.Rj.(M.Aj)'$ (5b) $1Cj = Cx'.[K.Rj'.Aj + K'(Rj.Cj' + Rj.Aj + Cj'.Aj)] + Cx.Cj + 1$
$0Cj = Cx'.[K.Rj.A'j + K'(Cj.A'j + Cj.R'j + R'j.Aj')] + Cx.Cj + 1'$

Occasionally it might be possible to set $Cj'$ in an expression for $1Cj$ in either of the cases (5a) or (5b) equal to 1, and $Cj$ in the case of $0Cj$ equal to 1 since it is normally assumed that it will be necessary to set $1Cj$ if the condition $Cj'$ is true and to set $0Cj$ if the condition $Cj$ is true. However, in both of the cases (5a) and (5b), the assumption of such conditions for simplification would simply mean that under certain gating conditions, a signal would be applied both to the $1Cj$ and $0Cj$ terminals of flip-flop $Cj$ simultaneously. For this reason, it is necessary to use $Cj'$ in $1Cj$ and $Cj$ in $0Cj$.

Figure 6B:
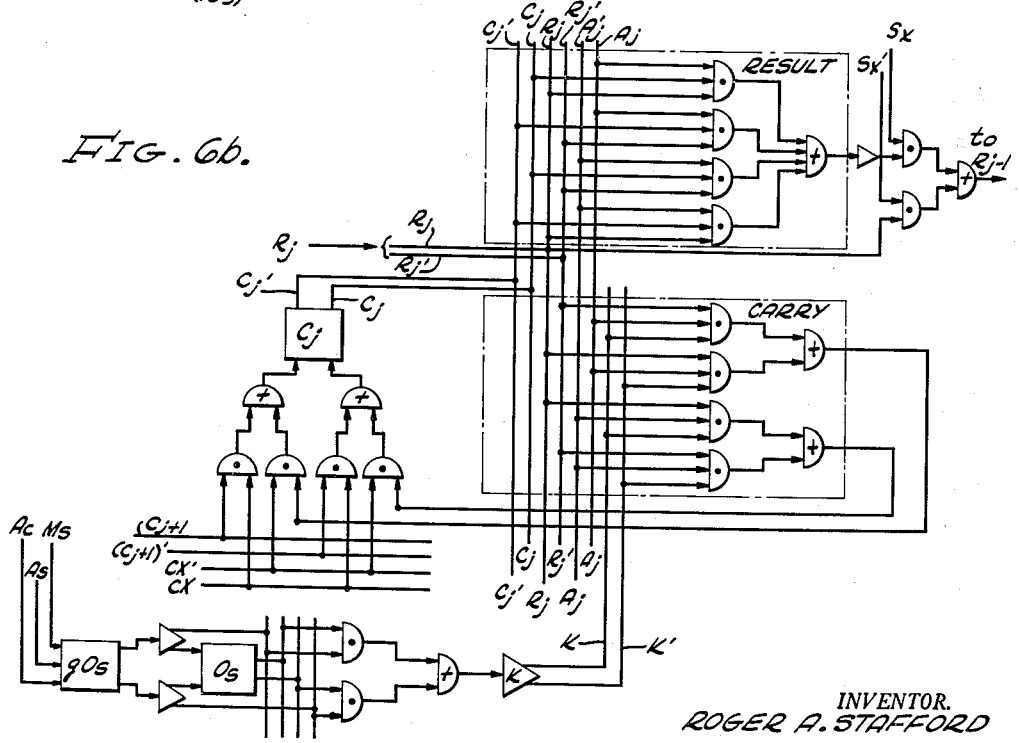

As indicated in FIGS. 6a and 6b, signals K and K' may be generated through an inverting amplifier, in which case the input logic therefor corresponds to the 1-setting logic for flip-flop K. The amplifier logic may be specified as follows:

to $K = Os.(0Os)' + Os'.(1Os)'$

The input logic for flip-flop $Os$ is a function o finput signals $Ac$, $As$ and $Ms$ corresponding, respectively, to the accumulation sign, multiplicand sign and multiplier sign. Note must be taken, of course, of the change in the multiplier sign which occurs upon receipt of a binary 1 in the most significant digit position for a complementary number, as discussed above. The general form for the input logic defining signal $Os$ specifies that the sign is negative, if any one of the three input signs is negative and the others are positive, or if all three signs are negative. This will be recognized to be similar to the result network logic above and may be represented as follows:

$Os = Ac.Ms.As + Ac.Ms'.As' + Ac'.Ms.As' + Ac'.Ms'.As$

In comparing FIGS. 6a and 6b, it will be noted that in FIG. 6a the input digit signals are represented as $M.Aj$, whereas the signals $Aj$ are applied directly in FIG. 6b. It will be noted that the result signal produced by the network of FIG. 6b is passed through an amplifier and then applied to a network controlled by signals $Sx$ and $Sx'$. Signal $Rj$ is also applied to this network so that the result signal is passed through the network in response to the signal $Sx$ and the previous result digit $Rj$ is passed through the network in response to signal $Sx'$.

In other respects, the general form of the networks shown in FIGS. 6a and 6b will be readily understood from the logic introduced above.

Reference is now made to FIGS. 7a and 7b constituting together a partial schematic and block diagram of a division system incorporating arithmetic units mechanized in accordance with the present invention. The division system will not be described in any detail beyond that which is necessary to show the manner in which the basic arithmetic units are incorporated therein, since the system features thereof are covered in copending application for "High-Speed Division System" by Roger A. Stafford, filed May 23, 1957, Serial No. 661,157. This copending application need not be considered at this time in view of the fact that the following description adequately points out the manner in which division is performed utilizing the basic arithmetic units of the present invention.

In the division system, the divisor is entered into storage devices $A1 \ldots Aj \ldots An$, which may be noted to be shown in reversed order with respect to the previous figures. The reason for this is that the most significant divisor digit is assumed to have entered into storage device $A1$ and successively lower place digits to have been entered into storage elements to the right thereof with the least significant digit of the dividend being entered into device $An$.

In a similar manner, the partial remainder register is shown reversed with respect to the previous drawing representation in order to indicate that the most significant digit of the partial remainder is entered into storage device $Ro$, and that successively lower place remainder digits then are entered into storage devices having successively higher digit representations. This manner of utilization of the structure for division makes it possible to share the full adder-subtractor logic for multiplication. In this manner, the partial remainder, which initially corresponds to the dividend, is continuously shifted to the left with respect to the divisor so that successive additions and subtractions may be performed to form quotient digits, each addition and subtraction being performed during a digit time interval without cascading carries.

In the division system each carry produced by a full adder-subtractor must be shifted to the left by two digital places so as to represent a weight of twice the corresponding result digit which is shifted to the left by only one digital position. It will be understood, of course, that other means of accomplishing the partial remainder shift with respect to the divisor are possible. For example, if the divisor is shifted to the right, the partial remainder signals may be left stationary, and the result digits are then reentered into the same place and the carry digits are shifted to the left by one place. This division operation may be made consistent with multiplication if the multiplicand for multiplication is then shifted to the left.

Returning again to FIGS. 7a and 7b, it will be noted that certain signals of the divisor register and the partial remainder register are applied through a gating circuit $gN$ to a storage device N which produces output signals N and N' indicating, respectively, that the partial remainder register is to operate as a series of full adder-subtracters, or as a shifting register. Thus, in this respect, device N is similar to device $Sx$ introduced above for the multiplication system. The letter "N" is employed in order to indicate that when $N=1$, the division step is effectively a "do nothing" operation, where the remainder is shifted and neither addition nor subtraction is performed. The purpose of this "do nothing" or 0 step will be understood when the division example is considered below. Signal N' then indicates the other situation where addition or subtraction is to be performed.

As in the other systems employed in the present invention, the operation sign is entered into device Os which controls device K as before. Device K is shown as an amplifier illustrating a division system where control signals K and K' are produced without delay, although it is shown in the above-mentioned copending application that a flip-flop storage technique may also be employed.

The definition of the sign signal is quite complex and will not be considered in any detail herein since the necessary description is found in the above-mentioned co-pending application, and it is only necessary to note for present purposes that the two output signals Os and Os' indicate negative and positive operation signs, respectively.

Before returning again to a further description of FIGS. 7a and 7b, and then FIG. 8, it is helpful to consider a specific division example as follows:

EXAMPLE 14

*2821/91=31*

| K | N | Os |  | 14 13 12 | 11 10 9 8 7 6 5 4 3 2 1 | +Q | −Q |
|---|---|---|---|---|---|---|---|
|   |   |   | A1 |           1 | 0 1 1 0 1 1 0 0 0 0 0 |   |   |
| 1 | 0 |   | +R1 | 0 0 1 | 0 1 1 0 0 0 0 0 1 0 1 | 1 | 0 |
|   |   |   | −C1 |     0 0 | 0 0 0 0 0 0 0 0 0 0 0 |   |   |
| 1 |   |   | +R2 | 0 0 0 | 0 0 0 1 1 0 0 1 0 1 0 | 0 | 0 |
|   |   |   | −C2 |     0 0 | 0 0 1 1 0 0 0 0 0 0 |   |   |
| 1 |   |   | +R3 | 0 0 0 | 0 0 1 1 0 0 1 0 1 0 0 | 0 | 0 |
|   |   |   | −C3 |     0 0 | 0 1 1 0 0 0 0 0 0 0 |   |   |
| 1 |   |   | +R4 | 0 0 0 | 0 1 1 0 0 0 1 0 1 0 0 0 | 0 | 0 |
|   |   |   | −C4 |     0 0 | 1 1 0 0 0 0 0 0 0 0 |   |   |
|   |   | + | A5 |           1 | 0 1 1 0 1 1 0 0 0 0 0 |   |   |
| 0 | 0 |   | +R5 | 0 0 0 | 1 1 0 0 1 0 1 0 0 0 0 | 0 | 1 |
|   |   |   | −C5 |     0 1 | 1 0 0 0 0 0 0 0 0 0 |   |   |
|   |   | − | A6 |           1 | 0 1 1 0 1 1 0 0 0 0 0 |   |   |
| 0 | 0 |   | −R6 | 0 0 0 | 0 1 0 0 1 1 0 0 0 0 0 | 1 | 0 |
|   |   |   | +C6 |     0 1 | 1 0 1 1 1 0 0 0 0 0 |   |   |
| 1 |   |   | +R7 | 0 0 1 | 0 0 1 1 0 0 0 0 0 0 0 | 0 | 0 |
|   |   |   | −C7 |     0 1 | 0 0 1 1 0 0 0 0 0 0 |   |   |

EXAMPLE 15

*105/5=21*

| K | N | Os |  | 9 8 7 | 6 5 4 3 2 1 | Q |
|---|---|---|---|---|---|---|
|   |   | − | A1 |       1 | 0 1 0 0 0 0 |   |
| 1 | 0 |   | +R1 | 0 0 1 | 1 0 1 0 0 1 | +1 |
|   |   |   | −C1 |     0 0 | 0 0 0 0 0 0 |   |
|   |   | − | A2 |       1 | 0 1 0 0 0 0 |   |
| 1 | 0 |   | +R2 | 0 0 1 | 1 1 0 0 1 0 | +1 |
|   |   |   | −C2 |     0 1 | 0 0 0 0 |   |
|   |   | + | A3 |       1 | 0 1 0 0 0 0 |   |
| 0 | 0 |   | +R3 | 1 1 1 | 0 0 0 1 0 0 | −1 |
|   |   |   | −C3 |     0 0 | 0 0 0 0 |   |
|   |   | − | A4 |       1 | 0 1 0 0 0 0 |   |
| 0 | 0 |   | −R4 | 0 0 0 | 1 0 1 0 0 0 | +1 |
|   |   |   | +C4 |     0 1 | 0 1 0 0 |   |
|   |   | + | A5 |       1 | 0 1 0 0 0 0 |   |
| 0 | 0 |   | +R5 | 0 0 1 | 0 1 0 0 0 0 | −1 |
|   |   |   | −C5 |     1 0 | 1 0 0 0 |   |
|   | 1 |   | −R6 | 0 0 1 | 0 0 0 0 0 | 0 |
|   |   |   | +C6 |     0 1 | 0 0 0 0 | . |

In Example 14 the binary number 1011011, corresponding to the decimal number 91, constitutes the divisor and is entered into the A register, and in particular into storage devices A6 through A12, the other signals being entered being binary 0's. The dividend is the binary number 101100000101, corresponding to the decimal number 2821, and is initially entered into the partial remainder register appearing in storage devices R1 through R12.

It will be noted that the first operation sign Os is assumed to be minus and that the first quotient digit entered is $+Q=1$. Thereafter, whenever N equals 0, indicating that either addition or subtraction is to be performed, a plus quotient digit $+Q$ is entered into the quotient register when the operation sign is negative, and a minus quotient digit $-Q$ is entered into the quotient register when the operation sign is positive.

As in the previous examples, each time the operation sign is negative, the new carry which is formed is negative and the result signals are positive. Thus, series R2 in Example 14 is positive and series C2 is negative, following the negative operation sign.

It will be noted that whenever signal $N=1$, the result and carry registers are shifted to the left. In these cases the divisor signals are not shown since they are not combined through the full adder-subtracters. Whenever $N=0$, either addition or subtraction is performed, each result signal is shifted to the left by one binary place as it is formed, and each carry signal is shifted to the left by two binary places as it is formed. In this manner, each partial remainder is effectively shifted to the left with respect to the divisor.

It is assumed, for the purpose of Example 14, that the result and carry digits in columns 12, 13 and 14 are sensed in order to determine the next operation step. Whenever it is noted that the digits in these columns constitute a negative total result, the operation sign is made positive, whereas whenever these digits indicate a positive result the operation sign is made negative. When the digits in columns 12, 13 and 14 represent a zero total result and consequently do not indicate either positive or negative signs, a "do nothing" step is performed during which times signal $N=1$, and 0's are shifted into both the $+Q$ and $-Q$ registers.

It will be noted that, as in the other operations, signal $K=1$ whenever the present and previous operation signs are the same or whenever the present operation sign is the same as the previous carry sign. The value of signal K is not specified during those times that signal $N=1$, since it need not be known. In a similar manner, the operation sign Os is not shown at such times as the "do nothing" steps are performed, so that the logic for gating network gOs may be simplified to permit the generation of any signal desired during such intervals.

In considering the specific sequence of Example 14, it will be noted that the first combination of the signal series −A1, +R1, and −C1, results in digits +R2 and −C2 in columns 12, 13 and 14 which are all 0's. This condition remains for three successive digit time intervals during which the "do nothing" steps are performed and 0's are entered into the quotient digit registers. When the signal series A5, R5 and C5 are present in the respective registers, it is noted that the partial remainder is negative, so that a plus operation sign is attributed to the series A5. Thus, a minus quotient digit is entered into register −Q and the new carries formed have implied positive signs resulting in signal series +C6.

The complete answer is determined by combining the plus and minus quotient digits serially. Effectively, the answer is a plus binary number +100001 and a minus binary number −000010, or +33−2=31 corresponding to the binary number +011111.

Example 15 is similar to Example 14 in most respects except that no "do nothing" steps occur until the last operation and a digit appears in the most significant place of the remainder register shown as column 9 in this example, noted specifically in series +R3. In this case it will be noted that the associated carry signal C3 is entered as a minus sign rather than a number. The reason for this is more fully described in the above-mentioned copending application relating to the division system, wherein general and specific techniques for modifying the logic for the most significant result and carry places are introduced whereby these digits represent the complete value in the place. This technique considerably simplifies the decision logic which is necessary to formulate the operation sign signal Os, the "do nothing" signal N, and the carry control signal K.

It will be noted that the quotient is shown as a series of plus and minus signals in Example 15 to illustrate another manner of definition. The complete answer, then, is +11010—00101 or +10101, corresponding to the decimal number 21.

While a variety of specific forms are possible, the basic result logic may be expressed, as above, as follows:

to $$Rj-1 = Rj.Cj.Aj + Rj.Cj'.Aj' + Rj'.Cj.Aj' + Rj'.Cj'.Aj$$

This basic logic is found in each result network except full adder-subtracters FAS1, FAS$n$—1, and FAS$n$ which may be simplified for various reasons pointed out below. Since each full adder-subtracter logic is either shifted to the left under control of signal N' or is bypassed under control of signal N, in which case signal Rj—1 constitutes signal Rj, the complete logic going into each of storage devices R1 through R$n$—3 may be expressed as follows:

to $$Rj-1 = N'.(Rj.Cj.Aj + Rj.Cj'.Aj' + Rj'.Cj.Aj' + Rj'.Cj'.Aj) + N.Rj$$

The logic for storage device Ro may be simplified in view of the assumption that the most significant divisor digit A1 is always a binary 1. This may be accomplished by always shifting divisor to the left until a binary 1 appears in this position. With this assumption, the logic may be simplified as follows:

to $$Ro = N'.(R1.C1 + R1'.C1') + N.R1$$

The input logic for storage device R$n$—2 may be simplified by noting that the carry is zero in this place. In a similar manner the carry may be assumed to be zero in the input logic for storage device R$n$—1. These cases may be expressed as follows:

to
$$Rn-2 = N'.(Rn-1'.An-1 + Rn-1.An-1') + N.Rn-1$$

to
$$Rn-1 = N'.(Rn'.An + Rn.An') + N.Rn$$

Storage device R$n$ is either set to zero at the first step of division and left in this state, thereby causing zeros to be entered into full adder-substracter, or the least significant half of a double length dividend may be shifted into device R$n$.

The manner in which the logic for storage device Roo is derived is quite complex and will not be considered here, reference being made to the above-mentioned copending application. It is sufficient to note, for present purposes, that this signal corresponds to the most significant digit position in Examples 14 and 15 above and may be formulated as a complete digit value, the sign thereof being represented by carry signal Coo. It is shown, however, in the above-mentioned copending application that many alternative schemes are possible. A suitable logical definition for the input circuit driving storage device Roo is submitted here in order to illustrate a typical form of such a circuit and to generally familiarize the reader with the problem involved. This logic appears as follows:

$$1Roo = Roo'.N'[K(Co+Ro')(C1+R1') + K'(Co' + Ro)(C1'+R1)] + Roo'.N.(Co'.Ro + Co.Ro') + Roo'.[(K+C1.R1')Co.Ro' + (K' + C1'.R1)Co'.Ro]$$

$$0Roo = K.N'.Co.Ro'(C1+R1') + K'.N'.Co'.Ro(C1'+R1)$$

As in the case of the development of the result signals, the carry signals are either entered into associated storage devices in response to signal N' or they are shifted to the left in response to signal N. The general expression for this operation may be written as follows:

to
$$Cj-2 = N'.[K.(Rj'.Cj + Cj.Aj + Rj'.Aj) + K'.(Rj.Cj' + Rj.Aj + Cj'.Aj)] + N.Cj-1$$

The above general carry logic applies to carry storage stages Co through C$n$—4, carries C$n$—3 and C$n$—2 being simplified in view of certain assumptions which may be made with respect to that end of the register.

Carry C$n$—3 may be simplified in view of the fact that there is no input carry from any previous place, it being assumed that carry C$n$—1=0. This, then, may be expressed as follows:

to
$$Cn-3 = N'.[K.Rn'-1.An-1 + K'.(Rn-1 + An-1)] + N.Cn-2$$
$$= N'.Rn'-1.An-1 + N'.K'.Rn-1 + N.Cn-2$$

In a similar manner, carry C$n$—2 may be simplified and further reduced in view of the fact that no other carry may be shifted into this position during the "do nothing" operation. This, then, provides the function:

to
$$Cn-2 = N'.[K.Rn'.An + K'.(Rn+An)]$$
$$= N'.Rn'.An + N'.K'.Rn$$

It will be understood that while the arithmetic unit shown in FIG. 8 represents most of the stages of the partial remainder register, the modifications necessary to cover the simplification cases are also considered to fall within the general definition of the "$j$th" stage. Thus, as pointed out above, the general schematic representation of the unit is not intended to constitute a structural definition thereof but rather a convenient means of showing its general form, with the understanding that logical variations may be made either through algebraic manipulation or through simplification which may be made by various assumptions.

It is to be understood that the expression "bi-level control signals" as used herein includes all definitions of K which are possible. As will be seen hereinafter, K may be defined in several different ways.

An interesting variation which may occur in the logical definition of control signals K and K' is shown in FIG. 7$a$ as employed in the division system. In this case, both signals Os and K are generated through networks and associated amplifiers, without delay. It is established, however, in the above-mentioned copending application that delay or storage logic may be employed for division as well. Where signals are generated without delay, it is still necessary to store each operation sign so that both present and previous operation signs may be analyzed in forming signals K and K'. In order to avoid cascading logical networks, however, signal K may be defined directly in terms of the same logic utilized to define the operation sign signal. The general manner of obtaining this derivation will be shown here by assuming that the present operation sign is generated through a network $gOs$ and that this signal is then shifted into operation sign storage device Os through an amplifier stage which also provides suitable signals $gOs$ and $gOs'$ for various other points of utilization. With this definition, signal K may then be expressed as follows:

$$K = gOs.Os + (gOs)'.Os'$$

This function indicates that K, as before, is equal to 1 whenever the present operation sign, now represented by either of signals $gOs$ or $(gOs)'$, is the same as the previous operation sign represented by signals Os and Os'.

The logic for the present operation sign control signal $gOs$ may assume any of a multitude of forms, depending upon the particular division scheme desired, one suitable form which is derived in the above-mentioned copending application being expressible as follows:

$$gOs = Coo'.Roo + Roo'.[Os'.(Co'.Ro + Co'.Cl'. + Ro'.Cl') + Os.(Co.Ro' + Co.Cl + Ro'.Cl)].$$

A specific definition for signal K may then be derived from the above expression for $gOs$ and its complement $(gOs)'$ as follows:

$K = gOs.Os + (gOs)'.Os'$.
$K = Roo.(Os'.Coo' + Os.Coo) + Roo'(Co.Cl + Cl + Cl.Ro' + Co.Ro')$.

The "do nothing" signal N is defined as a signal which is 1 whenever the total result in the three most significant places is 0. This may be expressed as follows:

$N = Roo'.(Co.Ro + Co'.Ro')(Cl.Rl + Cl'.Rl')$

The operation sign storage simply involves shifting the operation sign into storage device Os whenever either addition or subtraction is performed. This may be expressed as follows:

$1Os = gOs.N'$
$0Os = (gOs)'.N'$

The signal for carry stage Coo, defining the sign of the total result in the most significant place involves a rather complex derivation which will not be specifically considered here. A suitable form for this signal may be expressed as follows:

to $Coo = Roo'(Os'.Co.Ro' + Os.Co'.Ro) + Roo'.(gOs).(Co.Ro + Co'.Ro')$

A suitable form of quotient digit entry may be illustrated by assuming that the technique of Example 14 is to be mechanized. In this case two registers are utilized, referred to hereafter as a $+Q$ register and a $-Q$ register. These two registers are driven by input flip-flops $+Qi$ and $-Qi$, respectively, the general input logic for these flip-flops being specified as follows:

$1(+Qi) = Os.N'$
$0(+Qi) = Os' + N$
$1(-Qi) = Os'.N'$
$0(-Qi) = Os + N$

In general, the above quotient digit logic specifies that the $+Q$ flip-flop is turned on whenever the present operation sign is negative ($Os = 1$) and is turned off whenever the present operation sign is positive or whenever a "do nothing" operation is performed as indicated by $N = 1$. Flip-flop $-Qi$, on the other hand, is turned on whenever the present operation sign is positive ($Os' = 1$) and is turned off whenever the operation sign is negative or a "do nothing" operation is specified. In this manner, binary 1's are entered into the $+Q$ register whenever the operation sign is negative, and 0's are entered therein whenever the operation sign is positive, while the binary 1's are entered into the $-Q$ register whenever the operation sign is positive.

A shift control signal QX is also applied to the registers in order to shift the signals to the right during the division operation. A control must also be specified to shift the quotient digit signals to the left so that they may be combined to form a complete result. The logic for this operation is not shown here since it involves a technique which is now well known in the computer art.

From the foregoing description it should now be apparent that the present invention provides a method and apparatus for accumulating input digits having varying signs by either addition or subtraction, the accumulation being performed at high speed without the necessity of cascading carries.

It has been shown that the invention may be employed for any of the basic digital operations, including addition, subtraction, multiplication, and division. It is obvious that the technique may be extended to other operations such as square root and integration.

It should also be apparent that the basic approach introduced by the invention, whereby all results and carry digits are formed with opposite implied signs, the carry digits bearing the sign of the previous operation, not only obviates the time-consuming requirement of cascading carries, but also eliminates a great deal of complex circuitry, including buffer amplifiers and the like, which are usually inserted between successive places of an accumulator register.

Several logical definitions of typical circuit arrangements employing the invention have been illustrated. It should be understood, however, that the cases considered herein are by no means exhaustive and in fact represent but a rather small percentage of all variations. Accordingly, it must be considered that each of the logical definitions introduced herein is generic to a class of other similar definitions which may be obtained therefrom by well known algebraic manipulation. Furthermore, each set of logic must be considered to be generic to various simplifications which may be performed by making substitutions relating to particular circumstances.

It is to be noted that a control signal may be produced to vary carry output signals according to the condition $K = 1$ or $K = 0$ based on any one of the previous operation result or carry signs and based on any one of the present operation result and carry signs. This means that there are nine combinations of signs by which the conditions $K = 1$ and $K = 0$ may be determined. For example, $K = 1$ under the following conditions:

(1) The present and previous operation signs are the same;

(2) The present operation sign and the previous carry sign are the same;

(3) The present operation sign and the previous result are different;

(4) The present carry sign and the previous operation sign are the same;

(5) The present and previous carry signs are the same;

(6) The present carry sign and the previous result sign are different;

(7) The present result sign and the preivous operation sign are different;

(8) The present result sign and the previous carry sign are different;

(9) The present and previous result signs are the same.

For the converse of the conditions (1) through (9) above, the condition $K = 0$ is true. Hence, the definition of the rule of signs stated in any one of the paragraphs (1) through (9) above with a corresponding converse condition always covers any other one of the nine rules stated.

What is claimed is:

1. A device for controlling an accumulator register to permit the accumulation of input numbers having different signs by either addition or subtraction, without requiring the cascading of carries through the register, said device comprising: first means for generating a present operation sign signal as a function of the sign of the input number to be accumulated and the sign of the accumulation plus for addition and minus for subtraction; second means for entering one of two types of carry digit signals into the register, the carry digit signals having value considered to be the same sign as the present operation sign signal, the first type of carry digit signals being entered into the register whenever the previous operation sign is the same as the present operation sign, and the second type of carry digit signals being entered whenever the previous operation sign is opposite the present operation sign; and third means for entering result digit signals having values considered to be of a sign opposite to the sign of the carry digit signals, the result digit signals in each place and the carry digit signals in the next more significant places, respectively, being combinable in accordance with the signs which they are considered to have to constitute a value representing the composite value of the previous carry and result digit signals in the same place.

2. A system including a plurality of result digit storage stages producing result digit signals and a corresponding plurality of carry digit storage stages producing carry digit signals for performing an accumulative serial-parallel multiplication wherein successive multiplicand and multiplier operands may have either positive or negative signs and the products resulting therefrom may be accumulated by either addition or subtraction, said system comprising: first means for generating an operation sign signal as a function of the signs of the multiplicand, multiplier and accumulation signs; second means for sensing the multiplicand, previous result and previous carry digit signals in each place to generate and enter one of two types of carry digit signals into the same place, each carry digit signal being considered to have a sign the same as that represented by the operation sign signal, the first type of carry digit signal being entered whenever the present and previous operation signs are the same, and the second type of carry digit signal being entered whenever the present and previous operation signs are different; and third means for sensing the multiplicand, result, and carry digit signals in each place to generate and enter a result digit signal into the next lower place, the result digit signal in each place and the carry digit signal in the next more significant place when combined in accordance with the signs which they are considered to have, constituting together a value representing the composite value of the previous carry and result digit signals in the same place.

3. A device for operating an accumulator register to accumulate input numbers N1, N2 . . . N$n$ in the series $(\pm N1)\pm(\pm N2)\pm$ . . . $(\pm Nn)$ to form an accumulated result consisting of a series of result digit signals and an associated series of carry digit signals considered to be of opposite sign, said device comprising: first means for generating positive and negative operation sign signals $+gOs$ and $-gOs$; second means for storing said signals $+gOs$ and $-gOs$ for one digit time interval to produce corresponding stored signals $Os$ and $Os'$, respectively; third means for generating control signals K and K' as a function of signals $+gOs$, $-gOs$, $Os$, and $Os'$, signal K indicating that the present and previous operation signs are the same and signal K' indicating when the present and previous operation signs are different; fourth means for generating first and second carry signals both being considered to have a sign the same as that of the present operation, the first carry signal being produced in response to signal K and the second carry signal being produced in response to signal K'; and fifth means for generating result digit signals considered to have signs opposite to the carry signal signs, the result digit signal in each place and the carry digit signal in the next more significant place, when combined in accordance with the signals which they are considered to have, constituting together a value representing the composite value of the previous result carry and result digits in the same place.

4. In a computing system including an accumulator register comprising a plurality of partial result signal storage stages and a corresponding plurality of partial carry signal storage stages, the position of each pair of stages in the register, one partial result signal storage stage and one corresponding partial carry signal storage stage, constituting a different binary place, and the on or off state of the signals stored in a binary plate representing, together, a total binary value for the binary place, the total representation of all values in said binary places constituting a binary number, said system also including first and second operation sign signal generators, said first signal generator producing a first operation sign signal representing the sign of the operation last performed when partial result and carry signals were formed and entered into respective stages of the register for storage, and said second signal generator producing a second operation sign signal representing the sign of the present operation to be performed to generate new partial result signals and corresponding new partial carry signals, the plus-representing sign signal produced by each generator signifying a present or previous operation of addition, and the minus-representing sign signal of each generator signifying a present or previous operation of subtraction, said system further including means for generating a bi-valued control signal having a first level when said first and second sign signals represent the same operation, and having a second level when said first and second sign signals represent different operations; a circuit for combining an input signal in a binary place with the corresponding partial result and partial carry signals in the same place, the combination being performed in accordance with the sign representations of said first and second sign signals, said circuit comprising: first and second carry producing circuits, said first carry producing circuit being actuated by the high level of said bi-level control signal to produce a first carry signal having a binary representation definable as a first logical function of the input signal, partial result, and partial carry signals in the same place, said second carry producing circuit being actuated by the low level of said bi-valued control signal to produce a second carry signal having a binary representation definable as a second function of the input signal, partial result signal, and partial carry signal in the same place; and a result signal producing circuit responsive to the input, partial result and partial carry signals in the same place for producing a new partial result signal.

5. An arithmetic unit, constituting one of several similar units arranged in respective association with partial result and partial carry signal storage devices, each unit being arranged to receive a respective binary input signal, having the same weight representation as the signals produced by the associated storage devices, the unit being operable to form a new partial result signal of the same weight as is stored by the associated storage device, and to form a new partial carry signal of twice the weight of the new partial result signal, and being responsive to a first sign signal indicating the sign of the next operation to be performed to generate the new partial result and carry signals, and responsive to a second sign signal indicating the signs of all the partial carry signals presently stored, all carry signals having the same sign and all result signals having a sign opposite to the sign of said carry signals, said unit comprising: a control circuit responsive to said first sign signal and to said second sign signal for producing first and second control signal representing when said sign signals signify like and unlike signs, respectively; and an adder-subtracter network for producing the new partial result and carry signals, said network including first and second carry circuits responsive to said first and second control signals, respectively, to produce a new partial carry signal having a sign corresponding to the present operation sign, and said adder-subtracter network also including a result signal generator for producing the new partial result signal of sign opposite to said carry signal and one-half the weight.

6. In an arithmetic system wherein a plurality of pairs of flip-flops are employed to store partial result and partial carry signals, each pair of flip-flops being arranged to store signals of a different binary place, the binary signal representation of the flip-flops in each place representing a total binary value for the place, and the combined representation of all binary values in all places constituting a stored binary number, the system further including a plurality of units, corresponding to said binary places, respectively, and means for generating operation and carry sign signals, the operation sign signal indicating addition for one sign and subtraction for the opposite sign, and the carry sign signal indicating the sign of all presently stored partial carry signals, all signs being the same, the sign of all partial result signals having the same sign opposite to that of the partial carry signals, each of said units comprising: a control circuit responsive to said sign signals for producing a normal control signal when said sign signals represent the same sign and for producing a complemented control signal when said sign signals represent the opposite sign; and an adder-subtracter network responsive to said normal control signal for producing new result and carry signals of minus and plus signs, respectively, when the operation sign and stored partial result and carry signs are plus, minus, and plus, respectively, said network producing result and carry signals of plus and minus signs, respectively, in response to said normal control signal, when said operation sign and stored partial result and carry signs are minus, plus, and minus, respectively, said network being responsive to said complemented control signal for producing a minus result signal and a plus carry signal when the operation sign, and stored partial result and partial carry signs are plus, minus, and plus, respectively, and said network being responsive to said complemented control signal to produce a plus result signal and a minus carry signal when the operation sign, and stored partial result and partial carry signs are minus, plus, and minus, respectively.

7. In a computing system including first and second series of bistable elements for storing corresponding series of binary partial result and binary partial carry signals, each pair of bistable elements being arranged to correspond to a different binary place of a number, the binary representation of both elements constituting a pair indicating a binary digit for the place, the combined representation of all binary digits in all places constituting the binary number, the system being adapted to add to or subtract from the number stored in said elements and including an operation sign device for producing a signal $Os'$ representing addition, and an operation sign $Os$ representing subtraction, and including means for storing each operation sign signal as it is formed so that both present and last-formed sign signals are present, and further including a device K for producing signals K and K' indicating that the present and stored last-formed operation sign signals represent the same, and different operations, respectively; an arithmetic unit for combining input signals $Ai$ and $Ai'$ applied in one binary place, with presently stored partial result signals $Ri$ and $Ri'$ in the same place, and presently stored partial carry signals $Ci$ and $Ci'$ in the same place, to form a new partial result signal $Ro$ for the same place and a new partial carry signal $Co$ for the next higher place, said unit comprising: a carry network responsive to signals K and K', respectively, for selectively producing first and second carry signals, the first carry signal being a function of signals $Ri'$, $Ci$, and $Ai$, and the second carry signal being a function of signals $Ri$, $Ci'$ and $Ai$; means for combining said first and second carry signals to produce said signal $Co$; and a result network for producing signals $Ro$ as a function of all signals $Ai$, $Ai'$, $Ri$, $Ri'$, and $Ci$. $Ci'$.

8. The arithmetic unit defined in claim 7, wherein said first carry signal is definable as a function of signals $Ri'$, $Ci$ and $Ai$ in the following manner—

$$Ri'.(Ci+Ai)+Ci.Ai$$

said second carry signal is definable as a function of signals $Ri$, $Ci'$ and $Ai$ in the following manner—

$$Ri.(Ci'+Ai)+Ci'.Ai$$

and signal $Co$ may be expressed as follows $$Ai.(Ri'.Ci'+Ri.Ci)+K'.Ri.Ci'+K.Ri'.Ci$$

where the dot (.) represents the logical "and," and the plus (+) represents the logical inclusive "or."

9. The arithmetic unit defined in claim 7, wherein there is further included a carry storage device having one and zero setting input circuits $1Co$ and $0Co$, each carry signal $Co$ then constituting the next carry input signal $Ci$, the signals applied to the input circuits $1Co$ and $0Co$ being definable by the expressions $$1Co=K.Ri'.Ai+K'.Ri.Ai$$
$$0Co=K.Ri.Ai'+K'.Ri'.Ai'$$

where the dot (.) represents the logical "and" and the plus (+) the logical inclusive "or," the terms $K.Ri'.Ai$ and $K.Ri.Ai'$ defining the signals produced by said first carry network, and the terms $K'.Ri.Ai$ and $K'.Ri'.Ai'$ defining the signals produced by said second carry network.

10. In combination with an accumulator register comprising a plurality of result signal storage elements and a corresponding plurality of carry signal storage elements, the position of each pair of elements in the register constituting a different binary place, the states of the pair of elements constituting, together, a total binary value for the place, a first sign signal generator for producing a signal representing the sign of the last performed operation, plus for addition and minus for subtraction, a second sign signal generator for producing a second sign signal representing the sign of the present operation, and a device for producing control signals for said register, said device comprising: storage means having one and zero setting input circuits for actuating said storage device to one and zero states, respectively; first and second gating circuits coupled to said one and zero setting input circuits, respectively; and a control network coupled to said gating circuits and to said storage device, said control network including a first control circuit for producing an output signal whenever said storage device is in a one state and said second gating circuit does not actuate said zero setting input circuit, and including a second control circuit for producing an output signal whenever said storage device is in a zero state and said first gating circuit does not actuate said one setting input circuit, the output signals produced by said storage device thereby representing the comparison of said first and second sign signals.

11. The device defined in claim 10 wherein said storage device is a flip-flop $Os$ including one and zero input circuits $1Os$ and $0Os$, and producing one and zero representing output signals $Os$ and $Os'$, respectively; said first control circuit producing a signal defined by the relationship $$Os.(0Os)'$$

and said second control circuit producing a signal defined by the relationship $$Os'.(1Os)'$$

where the dot (.) represents the logical "and" and the terms $(0Os)'$ and $(1Os)'$ are complementary to the input circuit terms $1Os$ and $0Os$, respectively; and wherein the complete operation of said device may be expressed in terms of a control signal K defined as follows $$K=Os.(0Os)'+Os'.(1Os)'$$

where the plus (+) represents the logical inclusive "or."

12. A cumulative add-subtract unit for combining an input number including the binary digits $A1 \ldots Aj \ldots An$, where the symbols $1 \ldots j \ldots n$ represent respective binary places, with result signals $R1 \ldots Rj \ldots Rn$ stored in respective flip-flops of a result register, and with carry signals $C1 \ldots Cj \ldots Cn$, stored in the respective flip-flops of a carry register, to form new result signals $Ro1 \ldots Roj \ldots Ron$ to be entered into respective results register flip-flops, and new carry signals $Co1 \ldots Coj \ldots Con$ to be entered into carry register flip-flops one digital position higher than the respective flip-flops receiving the result signals, said unit also receiving information signals indicating the sign of the present operation to be performed, such sign being also the sign of the input signals, said unit comprising: first means responsive to said information signals for producing and storing an operation sign signal; second means responsive to the stored operation sign signal then representing the last performed operation, and responsive to the information signal representing the present operation, for producing first and second control signals when the present and last-performed operation signals are the same and different, respectively, and a series of adder-subtractor networks, one for each of the binary digits of the input number, each of said networks including at least two carry circuits operable in response to said first and second control signals, respectively, for producing the new carry signals to be stored in said carry register, and including a result circuit for producing the new result signals to be stored in said result register, the sign of the carry signals being represented by the present operation sign, and the sign of the result signals being opposite to that of the carry signals.

13. The unit defined in claim 12, wherein said second means produces first and second control signals K and K' and wherein the new carry signal is definable as follows $$Cj+1=Aj.(Rj'.Cj'+Rj.Cj)+K'.Rj.Cj'+K.Rj'.Ci$$

where the dot (.) represents the logical "and," and the plus (+) the logical inclusive "or" and the prime (') the complementary state of the respective binary signal.

14. In combination with a plurality of result flip-flops and corresponding carry flip-flops, the position of each pair of flip-flops, one for result and one for carry, constituting a binary place, a signal generator for producing a present operation sign signal representing the sign of the present operation, plus for addition, and minus for subtraction, and a previous operation sign signal representing the sign of the last operation, a device for accumulating result and carry signals in said result and carry flip-flops, said device comprising: first means for generating a bilevel control signal having a first level when the present and previous operation sign signals have the same sign representation, and said control signal having a second level when the present and previous sign signals have different sign representations; and second means for selectively producing one of two carry signals in response to the first and second levels of said control signal, respectively; said second means further including a circuit for generating carry signals having digit values such that the combination thereof with result signals of one-half their binary weight constitutes the complete binary result for the binary place.

References Cited in the file of this patent

UNITED STATES PATENTS

| | | |
|---|---|---|
| 2,719,670 | Jacobs et al. | Oct. 4, 1955 |
| 2,729,773 | Steele | Jan. 3, 1956 |
| 2,775,402 | Weiss | Dec. 25, 1956 |
| 2,823,855 | Nelson | Feb. 18, 1958 |
| 2,888,202 | Blankenbaker | May 26, 1959 |
| 2,892,587 | Blankenbaker | June 30, 1959 |

OTHER REFERENCES

Weinberger et al.: A One-Microsecond Adder Using One-Megacycle Circuitry, IRE Transactions on Electronic Computers, vol. EC–5, No. 2, June 1956, pp. 65–73.

UNITED STATES PATENT OFFICE
CERTIFICATE OF CORRECTION

Patent No. 3,023,962                  March 6, 1962

Roger A. Stafford

It is hereby certified that error appears in the above numbered patent requiring correction and that the said Letters Patent should read as corrected below.

Column 2, line 8, after "Thus" insert -- the --; column 5, line 12, after "the" insert -- time --; line 16, after "as" insert -- a --; column 11, line 72, for "1" read -- K --; same line 72, for "K" read -- 1 --; column 12, line 59, for "FASJ" read -- FASj --; column 19, line 16, in EXAMPLE 11, after "+R5" strike out -- 1 --; line 32, in EXAMPLE 12, after "-R2" strike out -- 0 --; same EXAMPLE 12, line 43 thereof, for "0  1 1 0" read -- 0 0 1 1 0 --; column 21, line 23, after "Cj" for "is" read -- in --; line 73, after "will" insert -- also --; column 29, line 51, for "signals" read -- signs --; line 62, for "plate" read -- place --.

Signed and sealed this 25th day of December 1962.

(SEAL)
Attest:
ERNEST W. SWIDER
Attesting Officer

DAVID L. LADD
Commissioner of Patents